(12) United States Patent
Yamauchi et al.

(10) Patent No.: US 11,270,351 B2
(45) Date of Patent: Mar. 8, 2022

(54) ADVERTISEMENT PROVIDING METHOD AND ADVERTISEMENT DISTRIBUTION SYSTEM

(71) Applicant: Panasonic Intellectual Property Corporation of America, Torrance, CA (US)

(72) Inventors: Masaki Yamauchi, San Jose, CA (US); Nanami Fujiwara, Santa Clara, CA (US); Hiroshi Yahata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/134,965

(22) Filed: Dec. 28, 2020

(65) Prior Publication Data

US 2021/0118014 A1 Apr. 22, 2021

Related U.S. Application Data

(63) Continuation of application No. PCT/JP2019/031583, filed on Aug. 9, 2019.
(Continued)

(51) Int. Cl.
*G06Q 30/02* (2012.01)
*G06Q 50/00* (2012.01)
*G06F 40/20* (2020.01)

(52) U.S. Cl.
CPC ..... *G06Q 30/0273* (2013.01); *G06Q 30/0206* (2013.01); *G06Q 30/0277* (2013.01); *G06Q 50/01* (2013.01); *G06F 40/20* (2020.01)

(58) Field of Classification Search
CPC .................................................. G06Q 30/02
See application file for complete search history.

(56) References Cited

U.S. PATENT DOCUMENTS 10,991,011 B2 * 4/2021 Kim .................... G06Q 30/0259
2010/0121711 A1 * 5/2010 Park .................... G06Q 30/0254
705/14.52
(Continued)

FOREIGN PATENT DOCUMENTS

JP 2007-183863 A * 7/2007 ............. G06Q 30/02
JP 2014-92918 5/2014
(Continued)

OTHER PUBLICATIONS

Miralles-Pechuan, Luis; Jimenez, Fernando; Garcia, Jose Manuel, A novel auction system for selecting advertisements in Real-Time bidding (English), Oct. 22, 2020 (Year: 2020).*
(Continued)

*Primary Examiner* — Marilyn G Macasiano
(74) *Attorney, Agent, or Firm* — Wenderoth, Lind & Ponack, L.L.P.

(57) ABSTRACT

Provided is a method of providing an advertisement in an indoor space using a system including a processor and a memory storing information about a content of each of advertisements including a first advertisement. The method includes: (a) calculating a base fee of the first advertisement from a content of the first advertisement stored in the memory based on a first criterion determined in advance based on a viewer's impression of each advertisement; (b) calculating an additional fee of the first advertisement from the content of the first advertisement based on a second criterion determined in advance to determine whether to be an advertisement improper to the system; (c) selecting an advertisement to be provided from among the plurality of advertisements based on a sum of the base fee calculated and the additional fee calculated; and (d) outputting an instruction to provide, to the indoor space, the advertisement selected.

6 Claims, 26 Drawing Sheets

Related U.S. Application Data

(60) Provisional application No. 62/717,221, filed on Aug. 10, 2018.

(56) References Cited

U.S. PATENT DOCUMENTS

| | | | |
|---|---|---|---|
| 2014/0108145 A1* | 4/2014 | Patel | G06Q 30/0256 |
| | | | 705/14.54 |
| 2014/0129350 A1 | 5/2014 | Tashiro | |
| 2015/0206180 A1* | 7/2015 | Iyer | G06Q 30/0256 |
| | | | 705/14.49 |

FOREIGN PATENT DOCUMENTS

| | | | | |
|---|---|---|---|---|
| JP | 5523536 | 6/2014 | | |
| JP | 2015-531525 | 11/2015 | | |
| JP | 2017-123120 | 7/2017 | | |
| KR | 2010-0032779 A | * | 3/2010 | G06Q 30/02 |
| WO | 2014/059124 | 4/2014 | | |

OTHER PUBLICATIONS

Heng-Li Yang; Shiang-Lin Lin, The Decision of Building Location-Based Advertising Push Platform (Englis), 2019 International Conference on Intelligent Computing and its Emerging Applications (ICEA) pp. 110-114, Aug. 1, 2019 (Year: 2019).*

International Search Report (ISR) dated Oct. 29, 2019 in International (PCT) Application No. PCT/JP2019/031583.

* cited by examiner

FIG. 5

| ADVERTISEMENT TYPE | VIOLENT | RELIGIOUS | ADULT-RATED | DOES ADVERTISEMENT DISTRIBUTION COMPANY DETERMINE ADVERTISEMENT TO BE IMPROPER? (yes= IMPROPER) | ISSUANCE CONDITION (ADVERTISEMENT CHARGE) |
|---|---|---|---|---|---|
| ADVERTISEMENT CONTAINING VIOLENT EXPRESSION | yes | no | yes | yes | C1+C2 |
| ADVERTISEMENT CONTAINING RELIGIOUS EXPRESSION | no | yes | no | no | C1 |
| ADVERTISEMENT CONTAINING ADULT-RATED EXPRESSION | no | no | yes | yes | C1+C2 |
| ADVERTISEMENT CONTAINING NONE OF VIOLENT/ RELIGIOUS/ ADULT-RATED EXPRESSIONS | no | no | no | no | C0 |

FIG. 9A

| TIME FRAME | 6:00-12:00 | 12:00-18:00 | 18:00-24:00 | 24:00-6:00 |
|---|---|---|---|---|
| PURCHASE FREQUENCY OF PANEL IN TIME FRAME | 50 | 100 | 500 | 0 |
| C0 | MinC0+50 | MinC0+100 | MinC0+500 | MinC0 |
| C1 | MinC0+51 | MinC1+100 | MinC1+500 | MinC1 |

$$\text{PURCHASE FREQUENCY} = \frac{\text{SUM OF AMOUNTS OF PAST PURCHASES IN TIME FRAME}}{\text{THE NUMBER OF PANEL USING DAYS} * \text{HOURS IN TIME FRAME} / 24 \text{ HOURS}} * \text{COEFFICIENT}$$

FIG. 9B

| AUTOMOBILE | 1/1-1/31 | 2/1-2/27 | 3/1-3/31 | 4/1-4/30 |
|---|---|---|---|---|
| | POSITIVE 15000 NEGATIVE 100 | POSITIVE 10000 NEGATIVE 150000 | POSITIVE 10000 NEGATIVE 100000 | POSITIVE 15000 NEGATIVE 15000 |
| C0 | $MinC0 + \dfrac{100}{15100}$ | $MinC0 + \dfrac{150000}{160000}$ | $MinC0 + \dfrac{100000}{110000}$ | $MinC0 + \dfrac{150000}{300000}$ |
| C1 | $MinC1 + \dfrac{100}{15100}$ | $MinC1 + \dfrac{150000}{160000}$ | $MinC1 + \dfrac{100000}{110000}$ | $MinC1 + \dfrac{150000}{300000}$ |

FIG. 10

| | VIOLENT | RELIGIOUS | ADULT-RATED | SEASON | HOURS | WEATHER | MATCHING SCORE | BIAS STRENGTH FROM ADVERTISEMENT DISTRIBUTION COMPA | ISSUANCE CONDITION (ADVERTISEMENT CHARGE) | UPPER-LIMIT DISTRIBUTION FEE |
|---|---|---|---|---|---|---|---|---|---|---|
| FILTER STRENGTH OF PANEL | -5 | -3 | -3 | 1 | 1 | 1 | — | — | — | — |
| MATERIAL ATTRIBUTE AND DISTRIBUTION CHARGE OF ADVERTISEMENT A | 5 | 0 | 3 | 0 | -4 | 0 | -38 | C2 | C1+C2 | P1 |
| MATERIAL ATTRIBUTE AND DISTRIBUTION CHARGE OF ADVERTISEMENT B | 0 | 0 | 0 | 0 | 3 | 0 | 3 | 0 | C0 | P2 |
| MATERIAL ATTRIBUTE AND DISTRIBUTION CHARGE OF ADVERTISEMENT C | 0 | 0 | 0 | 0 | -2 | 5 | 3 | 0 | C0 | P3 |

DATE AND TIME OF ADVERTISEMENT DISTRIBUTION: 17:00 ON AUGUST 3rd
WEATHER AT ADVERTISEMENT DISTRIBUTION: CLEAR, WET-BULB GLOBE TEMPERATURE (WBGT): 32 DEGREES

FIG. 12

| | VIOLENT | RELIGIOUS | ADULT-RATED | SEASON | HOURS | WEATHER | MATCHING SCORE | BIAS STRENGTH FROM ADVERTISEMENT DISTRIBUTION COMPA | URL LINK EMBEDDED | ISSUANCE CONDITION (ADVERTISEMENT CHARGE) | UPPER-LIMIT DISTRIBUTION FEE |
|---|---|---|---|---|---|---|---|---|---|---|---|
| FILTER STRENGTH OF PANEL | -5 | -3 | -3 | 1 | 1 | 1 | — | — | — | — | — |
| MATERIAL ATTRIBUTE AND DISTRIBUTION CHARGE OF ADVERTISEMENT A | 5 | 0 | 3 | 0 | -4 | 0 | -38 | C2 | YES | C1+C2+C3 | P1 |
| MATERIAL ATTRIBUTE AND DISTRIBUTION CHARGE OF ADVERTISEMENT B | 0 | 0 | 0 | 0 | 3 | 0 | 3 | 0 | NO | C0 | P2 |
| MATERIAL ATTRIBUTE AND DISTRIBUTION CHARGE OF ADVERTISEMENT C | 0 | 0 | 0 | 0 | -2 | 5 | 3 | 0 | NO | C0 | P3 |

FIG. 14A

| | LIVING LOCATION | GENDER | AGE | HOUSEHOLD COMPOSITION | OCCUPATION | HOURS | PLACE OF STAY | APPARATUSES /HOUSEHOLD EQUIPMENT | ACTION | ... |
|---|---|---|---|---|---|---|---|---|---|---|
| USER A | KADOMA CITY | FEMALE | 40s | WITH PRESCHOOL CHILDREN | OFFICE WORKER | MORNING | LIVING ROOM | ILLUMINATION AIR CONDITIONER TV | WATCHING TV TAKING MEAL | ... |
| USER B | OSAKA CITY | MALE | 30s | WITH PRESCHOOL CHILDREN | OFFICE WORKER | MORNING | LIVING ROOM | ILLUMINATION TV TERMINAL | BROWSING INTERNET | ... |

FIG. 14B

| | LIVING LOCATION | GENDER | AGE | HOUSEHOLD COMPOSITION | OCCUPATION | HOURS | PLACE OF STAY | APPARATUSES /HOUSEHOLD EQUIPMENT | ACTION | ... |
|---|---|---|---|---|---|---|---|---|---|---|
| USER A | KADOMA CITY | — | 30s 40s 50s | WITH PRESCHOOL CHILDREN | — | EVENING 22:00-24:00 | — | TERMINAL | BROWSING INTERNET | ... |
| USER B | — | — | 30s 40s 50s | — | — | EVENING 22:00-24:00 | — | TERMINAL | BROWSING INTERNET | ... |

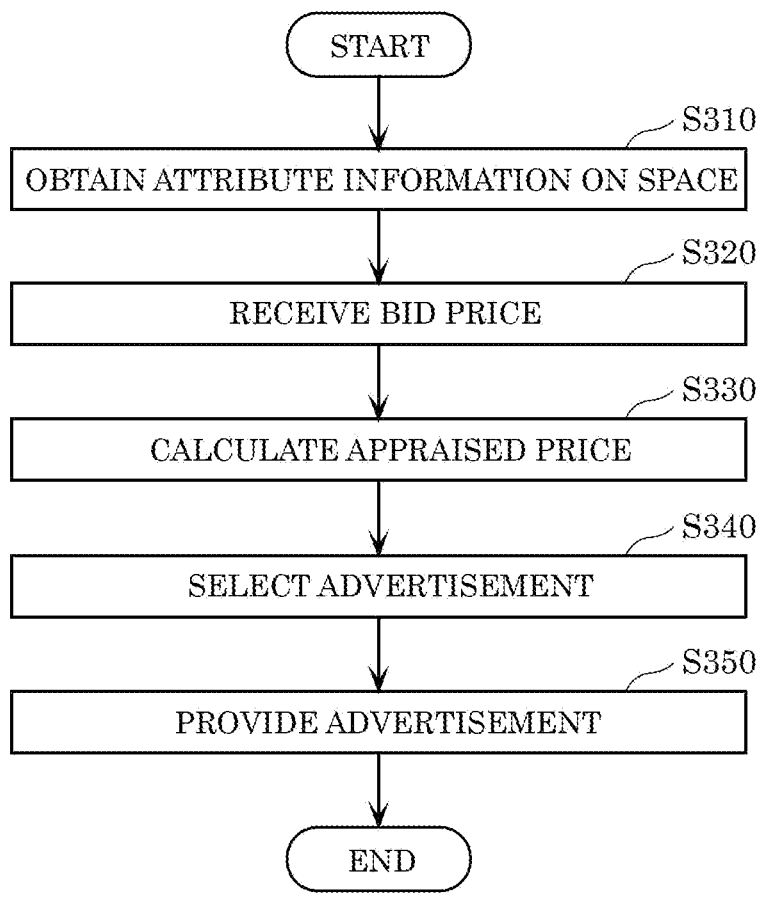

FIG. 16

| MATCHING FILTER | LIVING LOCATION | GENDER | AGE | HOUSEHOLD COMPOSITION | OCCUPA-TION | HOURS | PLACE OF STAY | APPARATUSES /HOUSEHOLD EQUIPMENT | ACTION | ... | TOTAL SCORE |
|---|---|---|---|---|---|---|---|---|---|---|---|
|  | 10 | 3 | 1 | 5 | 1 | 3 | 3 | 3 | 3 | ... | — |
| USER A | KADOMA CITY | FEMALE | 40s | WITH PRESCHOOL CHILDREN | OFFICE WORKER | MORNING | LIVING ROOM | ILLUMINATION AIR CONDITIONER TV | WATCHING TV TAKING MEAL | ... | — |
| ADVERTISE-MENT A | KADOMA CITY | — | 30s 40s 50s | WITH PRESCHOOL CHILDREN | — | EVENING 22:00-24:00 | — | TERMINAL | BROWSING INTERNET | ... | — |
| MATCHING SCORE | 10 | — | 1 | 5 | — | 0 | — | 0 | 0 | ... | 16 |

FIG. 17

| MATCHING SCORE | APPRAISED PRICE |
|---|---|
| 20 - | BID PRICE + $\alpha$ |
| 10 - 20 | BID PRICE |
| 0 - 10 | BID PRICE - $\beta$ |
| - 0 | NOT TO BE DISTRIBUTED |

FIG. 18

|  | ADVERTISEMENT A | ADVERTISEMENT B | ADVERTISEMENT C |
|---|---|---|---|
| MATCHING SCORE | 16 | 20 | -5 |
| BID PRICE | 110 | 100 | 150 |
| APPRAISED PRICE | 110 | 120 | - |

FIG. 19

| | LIVING LOCATION | GENDER | AGE | HOUSEHOLD COMPOSITION | OCCUPATION | HOURS | PLACE OF STAY | APPARATUSES /HOUSEHOLD EQUIPMENT | ACTION | PRESENCE OF CHILD | ... | TOTAL SCORE |
|---|---|---|---|---|---|---|---|---|---|---|---|---|
| MATCHING FILTER | 10 | 3 | 1 | 5 | 1 | 3 | 3 | 3 | 3 | -3 | ... | — |
| USER A | KADOMA CITY | FEMALE | 40s | WITH PRESCHOOL CHILDREN | OFFICE WORKER | MORNING | LIVING ROOM | ILLUMINATION AIR CONDITIONER TV | WATCHING TV TAKING MEAL | PRESENCE OF CHILD | ... | — |
| ADVERTISEMENT A | KADOMA CITY | — | 30s 40s 50s | WITH PRESCHOOL CHILDREN | — | EVENING 22:00-24:00 | — | TERMINAL | BROWSING INTERNET | PRESENCE OF CHILD | ... | — |
| MATCHING SCORE | 10 | — | 1 | 5 | — | 0 | — | 0 | 0 | -3 | ... | 13 |

FIG. 20

| | LIVING LOCATION | GENDER | AGE | HOUSEHOLD COMPOSITION | OCCUPATION | HOURS | PLACE OF STAY | APPARATUSES /HOUSEHOLD EQUIPMENT | ACTION | HOURS & ACTION | ... | TOTAL SCORE |
|---|---|---|---|---|---|---|---|---|---|---|---|---|
| MATCHING FILTER | 10 | 3 | 1 | 5 | 1 | 3 | 3 | 3 | 3 | -3 | ... | — |
| USER A | KADOMA CITY | FEMALE | 40s | WITH PRESCHOOL CHILDREN | OFFICE WORKER | MORNING | KITCHEN | ILLUMINATION AIR CONDITIONER COOKING STOVE | COOKING | | ... | — |
| ADVERTISEMENT A | KADOMA CITY | — | 30s 40s 50s | WITH PRESCHOOL CHILDREN | — | EVENING 22:00- 24:00 | — | TERMINAL | BROWSING INTERNET | MORNING COOKING | ... | — |
| MATCHING SCORE | 10 | — | 1 | 5 | — | 0 | — | 0 | 0 | -3 | ... | 13 |

FIG. 21

| | LIVING LOCATION | GENDER | AGE | HOUSEHOLD COMPOSITION | OCCUPATION | HOURS | PLACE OF STAY | APPARATUSES /HOUSEHOLD EQUIPMENT | ACTION | ⋮ |
|---|---|---|---|---|---|---|---|---|---|---|
| FAMILY A | KADOMA CITY | FEMALE | 40s | WITH PRESCHOOL CHILDREN | OFFICE WORKER | EVENING 22:00-24:00 | LIVING ROOM | ILLUMINATION AIR CONDITIONER TV | WATCHING TV | ⋮ |
| | KADOMA CITY | MALE | 30s | WITH PRESCHOOL CHILDREN | OFFICE WORKER | EVENING 22:00-24:00 | LIVING ROOM | ILLUMINATION | TAKING MEAL | ⋮ |
| FAMILY B | OSAKA CITY | MALE | 30s | WITH PRESCHOOL CHILDREN | OFFICE WORKER | EVENING 22:00-24:00 | LIVING ROOM | ILLUMINATION TV TERMINAL | BROWSING INTERNET | ⋮ |

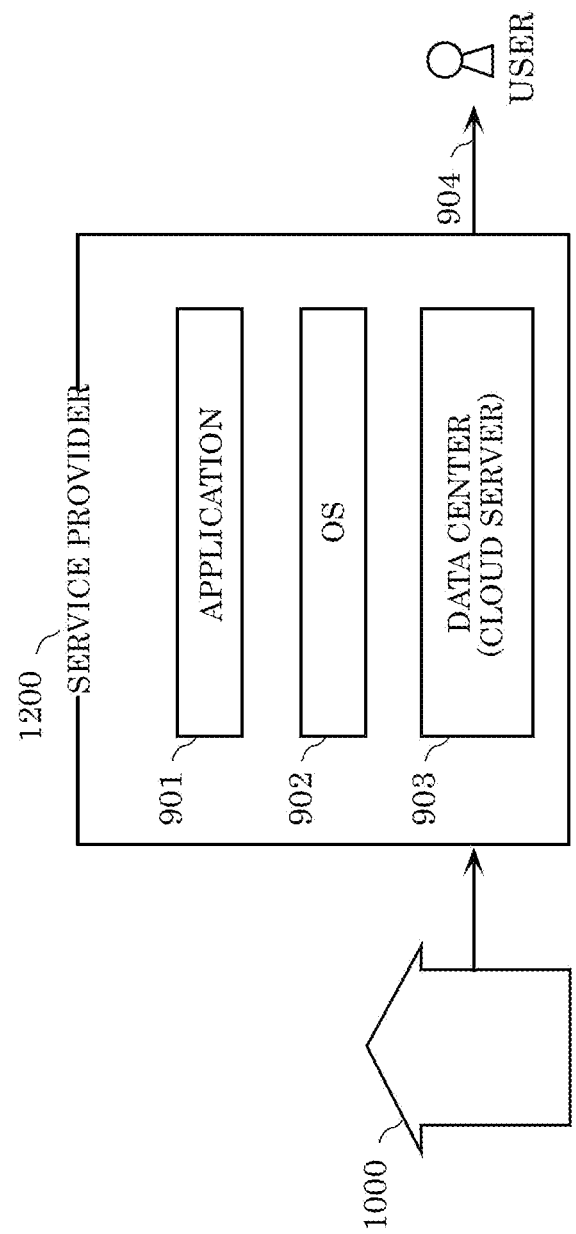

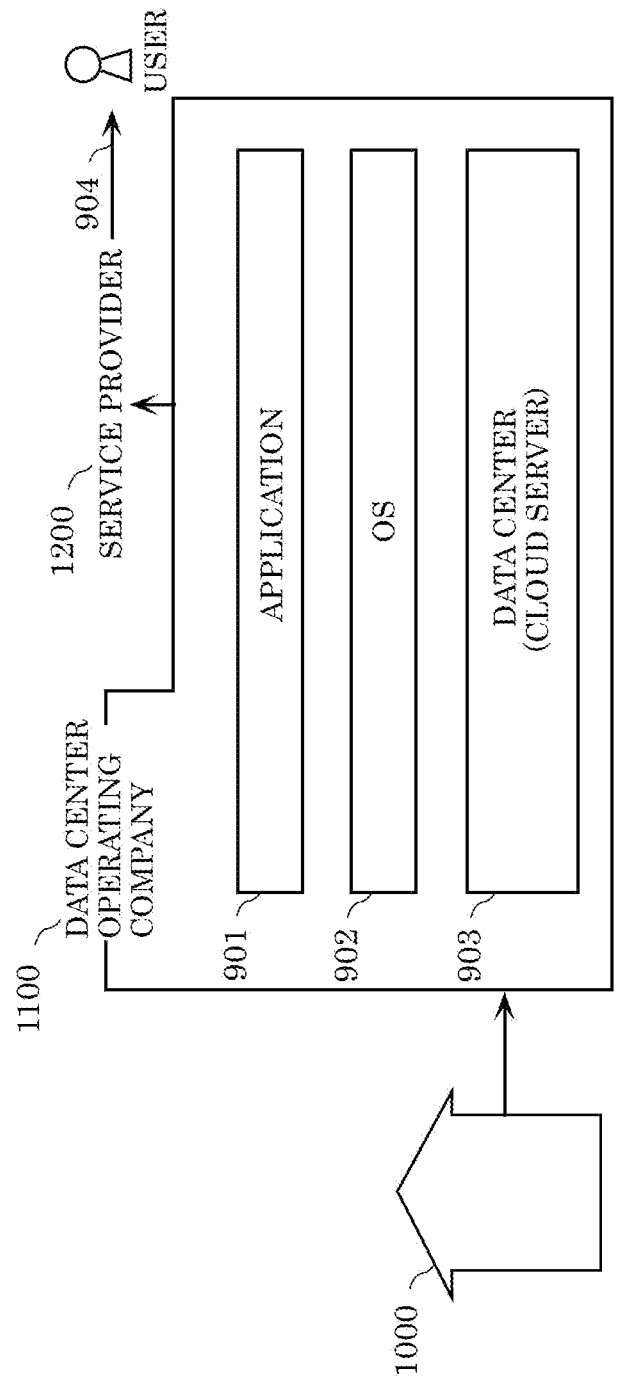

ADVERTISEMENT PROVIDING METHOD AND ADVERTISEMENT DISTRIBUTION SYSTEM

CROSS REFERENCE TO RELATED APPLICATIONS

This application is a U.S. continuation application of PCT International Patent Application Number PCT/JP2019/031583 filed on Aug. 9, 2019, claiming the benefit of priority of U.S. Provisional Patent Application No. 62/717,221 filed on Aug. 10, 2018, the entire contents of which are hereby incorporated by reference.

BACKGROUND

1. Technical Field

The present disclosure is related to an advertisement providing method and an advertisement distribution system for presenting information appropriately on an information display terminal in a dwelling space.

2. Description of the Related Art

Today, it is a common practice to infer needs of a person from information about web pages that the person has viewed on a smartphone or a personal computer, words that the person has searched for, or items that the person has purchased, and present an advertisement having a high relevance to the inferred needs prior to other advertisements.

In a system called affiliate marketing, when an advertisement on a web page is clicked and an item is purchased, a reward called affiliate fee is paid to a creator of the web page on which the advertisement is displayed (e.g., to a person who writes a blog and publishes the advertisement on the blog).

Such a system like affiliate marketing comes into widespread adoption because it can efficiently make a match among an advertiser who wants to distribute an online-advertisement, a web-page creator who wants to receive a reward by introducing an item and enticing a visitor to purchase the item, and a visitor who is looking for information about the item to consider purchasing the item.

On the other hand, affiliate marketing has not succeeded yet in being recognized in advertisement/information display service in space where people lead their lives, such as a house and a room (dwelling space).

For example, in a case of a TV commercial as an example, an advertisement cannot be changed for each of viewers because the TV commercial distributes the advertisement in one direction to unspecified viewers of a program. Moreover, when a viewer views a TV commercial and purchase an item of the TV commercial, the item is purchased through a channel completely different from a TV (at a physical store or through online shopping on the Internet). Therefore, an advertiser of the TV commercial cannot know what triggers the purchase of the item.

SUMMARY

In current online-advertisements, a scheme for providing an advertisement having a high relevance to an item/service that a viewer viewing a web page is interested in is adopted in order to promote an economic activity (e.g., purchasing an item) of the viewer (to be exact, an information terminal used by the viewer).

Therefore, whenever and wherever a viewer views a web page, an advertisement relevant to previous purchase history of a viewer is displayed irrespective of circumstance of the viewer viewing the advertisement at that time. This is a certain type of overfitting.

For example, Japanese Unexamined Patent Application Publication No. 2014-92918 discloses that in a case where there are a plurality of pieces of advertisement information, each of which has a calculated relevance greater than a relevance stored in an advertisement table, a piece of advertisement information that has a larger value of a bid price of the piece of advertisement information multiplied by a click through rate (CTR) is selected.

In such a method for providing an advertisement, it is difficult to present an advertisement having a high rationality and matching property to circumstances of a person living in a dwelling space. For example, if an advertisement related to item A purchased in the past is repeatedly provided, a rationality/matching property of the provided advertisement to circumstances of a person living in a dwelling space decreases. That is, the advertisement is not an advertisement useful for the person living in the dwelling space, not leading to a purchase of the item/service, and therefore results in a low cost effectiveness for an advertiser.

Hence, the present disclosure provides an advertisement providing method and an advertisement distribution system capable of distributing, to an indoor space, an advertisement having a high rationality/matching property to circumstances of the indoor space.

An advertisement providing method according to an aspect of the present disclosure is an advertisement providing method of providing an advertisement in an indoor space using a system including a processor and a memory that stores information about a content of each of a plurality of advertisements including a first advertisement. The advertisement providing method includes the following executed by the processor: (a) calculating a base fee of the first advertisement from a content of the first advertisement stored in the memory based on a first criterion determined in advance based on a viewers impression of each advertisement; (b) calculating an additional fee of the first advertisement from the content of the first advertisement based on a second criterion determined in advance to determine whether to be an advertisement improper to the system; (c) selecting an advertisement to be provided from among the plurality of advertisements based on a sum of the base fee calculated and the additional fee calculated; and (d) outputting an instruction to provide, to the indoor space, the advertisement selected.

Note that these comprehensive or specific aspects may be implemented in forms of a system, a method, an integrated circuit, a computer program, or a computer-readable storage medium such as a CD-ROM, or may be implemented in a form of a given combination of a system, a method, an integrated circuit, a computer program, or a computer-readable storage medium.

By an advertisement providing method according to an aspect of the present disclosure, an advertisement having a high rationality/matching property to circumstances of an indoor space can be distributed to the indoor space.

BRIEF DESCRIPTION OF DRAWINGS

These and other objects, advantages and features of the disclosure will become apparent from the following descrip

FIG. 5 is an explanatory diagram of advertisement charges based on advertisement material attributes in Embodiment 1;

FIG. 9A illustrates an example of a relation between past panel operation history and base fees corresponding to distribution conditions (advertisement charges) in the modification of Embodiment 1;

FIG. 9B illustrates an example of a relation between base fees and reaction information on users on the Internet in the modification of Embodiment 1;

FIG. 10 illustrates an example of a relation between advertisement charges and matching properties of attributes of a panel and advertisements in the modification of Embodiment 1;

FIG. 12 illustrates another example of a relation between advertisement charges, and matching properties of attributes of a panel and advertisements in the modification of Embodiment 1;

FIG. 14A illustrates an example of indoor space data in Embodiment 2;

FIG. 14B illustrates an example of advertisement data in Embodiment 2;

FIG. 15 is a flowchart illustrating a process by an advertisement distribution system according to Embodiment 2;

FIG. 16 is a table for describing an example of a matching level in Embodiment 2;

FIG. 17 is a table for describing an example of a correspondence relation between matching score and appraised price in Embodiment 2;

FIG. 18 is a table for describing an example of an appraised price in Embodiment 2;

FIG. 19 is a table for describing an example of a matching level in the modification of Embodiment 2;

FIG. 20 is a table for describing another example of a matching level in the modification of Embodiment 2;

FIG. 21 illustrates an example of indoor space data in the modification of Embodiment 2;

FIG. 23 illustrates Service type 1 (in-house data center type) in Embodiment 2;

FIG. 26 illustrates Service type 4 (SaaS utilization type) in Embodiment 2.

DETAILED DESCRIPTION OF THE EMBODIMENTS

Figure 1:
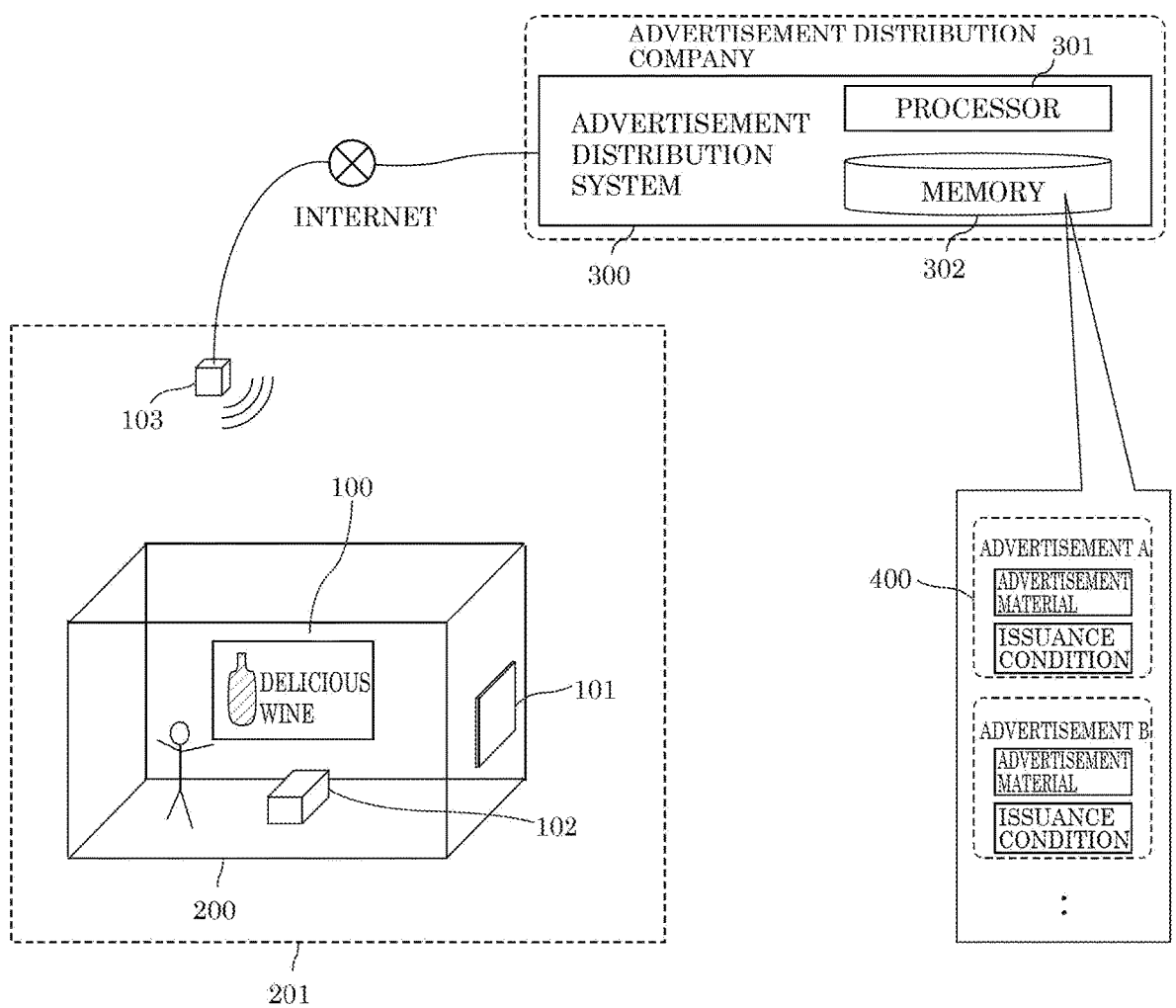
- FIG. 1 is an overall view of an advertisement distribution service according to Embodiment 1.

Embodiments will be described below with reference to the drawings.

Note that embodiments to be described below each show a comprehensive or specific example. Numeric values, shapes, materials, constituent components, disposition and connection of the constituent components, steps, orders of the steps, and the like shown in the following embodiments are mere examples and are not intended to restrict the scope of the present disclosure.

Note that each figure is not necessarily an exact illustration. In each figure, components being substantially the same will be denoted by the same reference character, and redundant description of the components will be omitted or simplified.

Embodiment 1

FIG. 1 is an overall view of an advertisement distribution service according to Embodiment 1; House 201 indicates a dwelling space of a resident. House 201 includes a plurality of living spaces. FIG. 1 illustrates living room 200 that is one of the plurality of living spaces. Living room 200 is an example of a dwelling space. Note that the dwelling space is not limited to a living room. The dwelling space may be, for example, a kitchen, a bedroom, or a children's room. Living room 200 is provided with television 101 and couch 102, and information display terminal 100 placed close to couch 102. Hereinafter, information display terminal 100 will be referred to as panel 100.

For example, while sitting down on couch 102 and watching television 101, the resident of this dwelling space uses panel 100 to adjust illumination and air conditioning of living room 200 or access information about time or weather or traffic jam of an area.

Information terminals including panel 100 and television 101 are connected to the Internet via, for example, wireless router 103 such as one for Wi-Fi®. Advertisement distribution system 300 is connected to the information terminals including panel 100 and television 101 over the Internet.

Advertisement distribution system 300 includes processor 301 and memory 302.

Processor 301 is an electronic circuit that executes instructions and/or a software program stored in memory 302. Executing the instructions and/or the software program stored in memory 302, processor 301 implements an advertisement distribution service according to the present embodiment. Various kinds of processing performed by processor 301 will be described below with reference to FIG. 2 to FIG. 4.

Memory 302 is implemented in a form of, for example, a semiconductor memory and/or a disk drive. Memory 302 stores advertisement data 400, which is information related to a plurality of advertisements including advertisement A and advertisement B. In advertisement data 400, each advertisement is managed such that an advertisement material that is material information about the advertisement is associated with an issuance condition in which advertisement distribution condition is described.

In conventional practices, when an advertisement distribution company selects an advertisement to be distributed to a resident, the advertisement distribution company selects an advertisement for which an advertiser pays a higher advertisement charge, an advertisement for which an advertiser pays a higher affiliate fee (reward) when the advertisement leads to purchase of an advertised item/service, or an advertisement related to an item/service that the resident has searched for or purchased, prior to others.

In a case where an advertisement selected in this manner is distributed to a personal terminal (e.g., smartphone or personal computer) of a resident, optimizing the advertisement for a specific person not likely to raise a problem. In contrast, in a case where an advertisement is distributed to an information terminal (e.g., panel 100 or television 101) placed in the dwelling space, optimizing the advertisement for a specific person can raise a problem.

In a dwelling space, a plurality of residents (e.g., family members or friends) lead their lives, and circumstances of the persons in the dwelling space (e.g., time, room temperature, humidity, etc.) significantly change every moment.

For example, an advertisement of an alcoholic drink is inappropriate to an information terminal placed in a dwelling space used by many minors (e.g., a children's room or a living room where no adult is present). If such an inappropriate advertisement is continuously distributed, a resident of the dwelling space considers that the advertisement distribution service is not sensible, thus being unnecessary and inappropriate service, results in a request for unsubscribing from the service.

Similarly, it is considered that providing an advertisement of an alcoholic drink in morning hours of weekdays, when people are in a hurry to get ready to go out, makes a low impact of advertising. For many people, the provision of an advertisement of an alcoholic drink may be rather acceptable in a situation where the people are calmly spending time (e.g., in the evening or later hours).

In addition, when an item is purchased from a shopping site on the Internet, there is a case before and after the purchase where the site is filled with advertisements of items that have been searched for. Such excessive recommendation (overfitting) should be reconsidered. The excessive recommendation degrades a value of a new advertisement. If such advertisements become disliked, the advertisement distribution service cannot be continued.

As above, it is difficult for an advertisement provided to a dwelling space to make a high impact of advertising unless the advertisement has a content suitable to circumstances of the dwelling space changing every moment and/or one or more persons who share the dwelling space.

Figure 2:
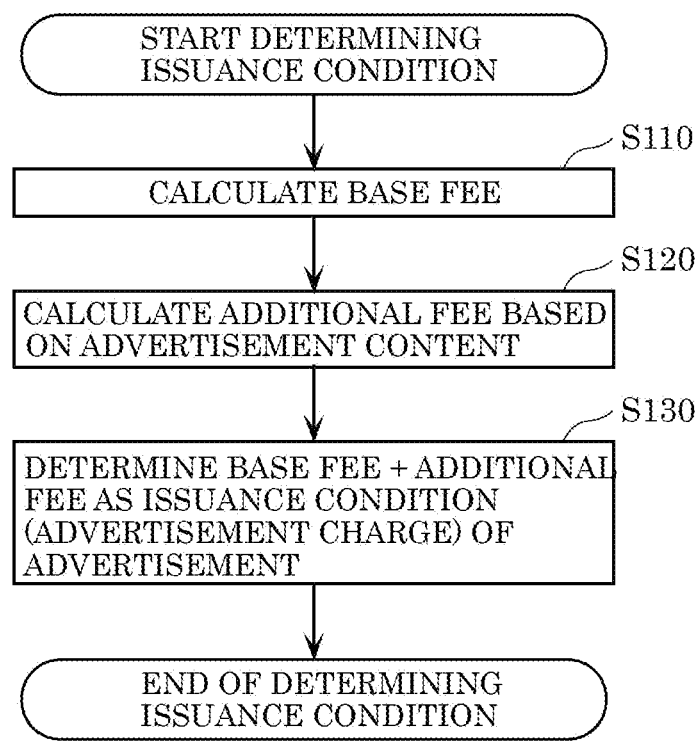
FIG. 2 is a flowchart illustrating a determination process of an advertisement charge in Embodiment 1.
Figure 3:
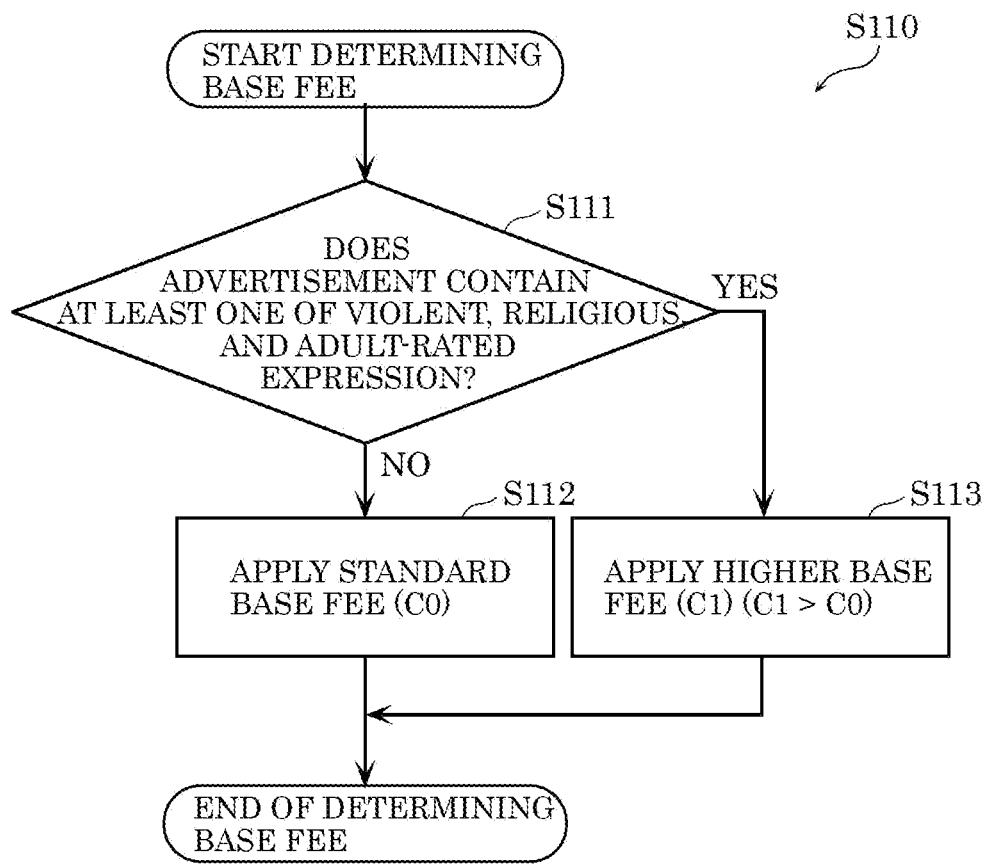
FIG. 3 is a flowchart illustrating the determination process of an advertisement charge in Embodiment 1.
Figure 4:
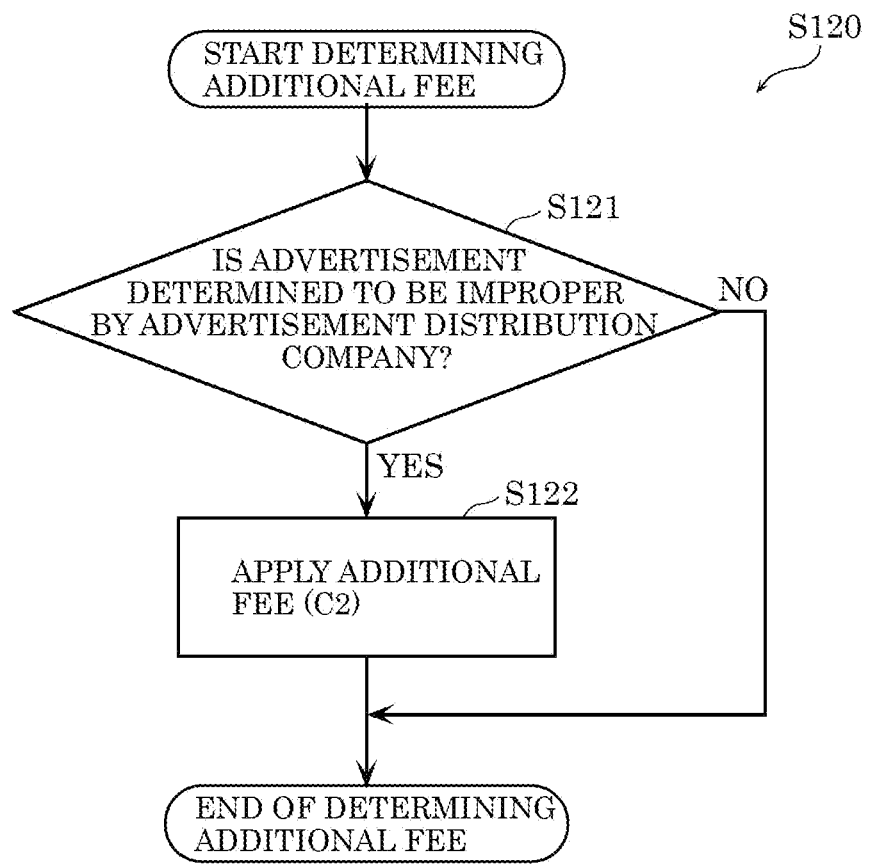
FIG. 4 is a flowchart illustrating the determination process of an advertisement charge in Embodiment 1.

FIG. 2, FIG. 3, and FIG. 4 are flowcharts illustrating how to determine an issuance condition (an advertisement charge) of an advertisement in Embodiment 1.

As illustrated in FIG. 2, in a determination process of the issuance condition, processor 301 first calculates a base fee from a content of an advertisement based on a first criterion determined in advance based on a viewer's impression of each advertisement (S110). Next, processor 301 calculates an additional fee from the content of the advertisement based on a second criterion determined in advance to determine whether to be an advertisement improper to advertisement distribution system 300 (S120). Processor 301 sums the base fee and the additional fee to determine the issuance condition (advertisement charge) of the advertisement (S130) and finishes the determination process.

In the determination process of the base fee (S110), as illustrated in FIG. 3, processor 301 determines whether the advertisement contains at least one of a violent expression, a religious expression, and an adult-rated expression (S111). Here, in a case where the advertisement contains none of a violent expression, a religious expression, and an adult-rated expression (No in S111), processor 301 applies a base fee (C0), which is a standard base fee for advertisement distribution system 300 (S112), and finishes the process of determining the base fee.

In contrast, in a case where the advertisement contains one or more of a violent expression, a religious expression, and an adult expression (Yes in S111), processor 301 applies a base fee (C1), which is higher than the standard base fee (C0) (S113), and finishes the process of determining the base fee.

C1 indicates a price higher than C0. C0 and C1 may be fixed values. The fixed values refer to constant values that do not vary based on various conditions. In addition, C0 and C1 may be variable values that vary with time based on a predetermined condition.

In addition, as elements used to determine the base fee, elements different from the violent expression, religious expression, and adult-rated expression may be adopted. For example, as the elements used to determine the base fee, an expression that approves of or encourages an act of violating law or ordinance and an expression that violates public order and morals may be adopted.

In the determination process of the additional fee (S120), as illustrated in FIG. 4, processor 301 determines whether the advertisement is an advertisement that is improper to the advertisement distribution system as determined by an advertisement distribution company operating the advertisement distribution system (S121). Here, in a case where the advertisement is an advertisement that is determined to be improper to the advertisement distribution system (Yes in S121), processor 301 applies an additional fee (C2) (S122); otherwise (No in S121), processor 301 do not charge the additional fee and finishes the determination process.

In this flowchart, the advertisement is determined based on the criteria from the advertisement distribution company, but this does not limit a party that makes the criterion to the advertisement distribution company. For example, the advertisement may be determined in conformity with criteria from a third-party organization and a result of the determination may be used to apply the additional fee.

As described with reference to FIG. 2, FIG. 3, and FIG. 4, in the present embodiment, a base fee is set based on a viewer's general impression of an advertisement. In addition, suitability of the advertisement is determined based on criteria from an advertisement distribution company based on a standpoint of a service provider, and an additional fee is set based on a result of the determination. Then, from the base fee and the additional fee that are set in this manner, a distribution charge (advertisement charge) of each advertisement is determined. That is, the charge can be determined based on a plurality of criteria for advertisement distribution. A criterion as to whether an advertisement matches to all users and a criterion as to whether the advertisement matches a part of the users can be set. For example, a criterion as to whether an advertisement is proper in light of conventional wisdom can be applied to all users, and a criterion as to whether the advertisement matches each location or each attribute of users, or the like, can be set. As an example, by setting a criterion for not providing an advertisement that users will feel negatively and setting a criterion for providing an advertisement that users will feel positively, an advertisement more appropriate to the users can be provided.

FIG. 5 shows instances of distribution conditions (advertisement charges) in Embodiment 1 in a tabular format.

According to FIG. 5, it is determined that an advertisement containing a violent expression contains a violent and adult-rated expression, and C1, which is a higher price as the base fee, is applied. In addition, according to a criterion from the advertisement distribution company, the advertisement containing this violent expression is determined to be improper to the advertisement distribution service, and C2 is added as the additional fee. As a result, a price that is a sum of C1+C2 is calculated as an issuance condition (advertisement charge) of the advertisement containing this violent expression.

To an advertisement that contains a religious expression, C1 is applied as the base fee because the advertisement contains a religious content. However, according to the criterion from the advertisement distribution company, the advertisement containing this religious expression is not determined to be improper to the advertisement distribution service. As a result, a price of C1 is set as an issuance condition (advertisement charge) of the advertisement containing the religious expression.

To an advertisement that contains an adult-rated expression, base fee C1 and additional fee C2 are applied as with the advertisement containing a violent expression, and a price of C1+C2 is determined as an issuance condition (advertisement charge). To an advertisement that contains none of a violent expression, a religious expression, and an adult-rated expression, base fee C0 is applied, and a price of C0 is determined as an issuance condition (advertisement charge).

Based on the advertisement charge determined in this manner, one or more advertisements are selected from among a plurality of advertisements. For example, from among the plurality of advertisements, an advertisement with a highest advertisement charge is selected. That is, based on the sum of the base fee and the additional fee, the advertisement to be provided is selected from among the plurality of advertisements. Then, an instruction to provide, to the dwelling space, the advertisement selected is output.

As described above, advertisement distribution system 300 according to the present embodiment is advertisement distribution system 300 that distributes an advertisement to an indoor space. Advertisement distribution system 300 includes: processor 301; and memory 302 that stores information about a content of each of a plurality of advertisements including a first advertisement, in which processor 301: (a) calculates a base fee of the first advertisement from a content of the first advertisement stored in memory 302 based on a first criterion determined in advance based on a viewer's impression of each advertisement; (b) calculates an additional fee of the first advertisement from the content of the first advertisement based on a second criterion determined in advance to determine whether to be an advertisement improper to system 300; (c) selects an advertisement to be provided from among the plurality of advertisements based on a sum of the base fee calculated and the additional fee calculated; and (d) outputs an instruction to provide, to the indoor space, the advertisement selected.

With this configuration, a distribution charge can be determined based on a plurality of criteria, and an advertisement that is proper to viewers of the advertisement as well as an advertisement distribution company can be distributed at an appropriate distribution charge.

Modification of Embodiment 1

Next, a modification of Embodiment 1 will be described. The present modification is different from Embodiment 1 described above mainly in that the base fee is changed in accordance with panel data and/or comments on the Internet, and the like. The present modification will be described below mainly about points different from Embodiment 1 described above, with reference to the drawings.

Figure 6:
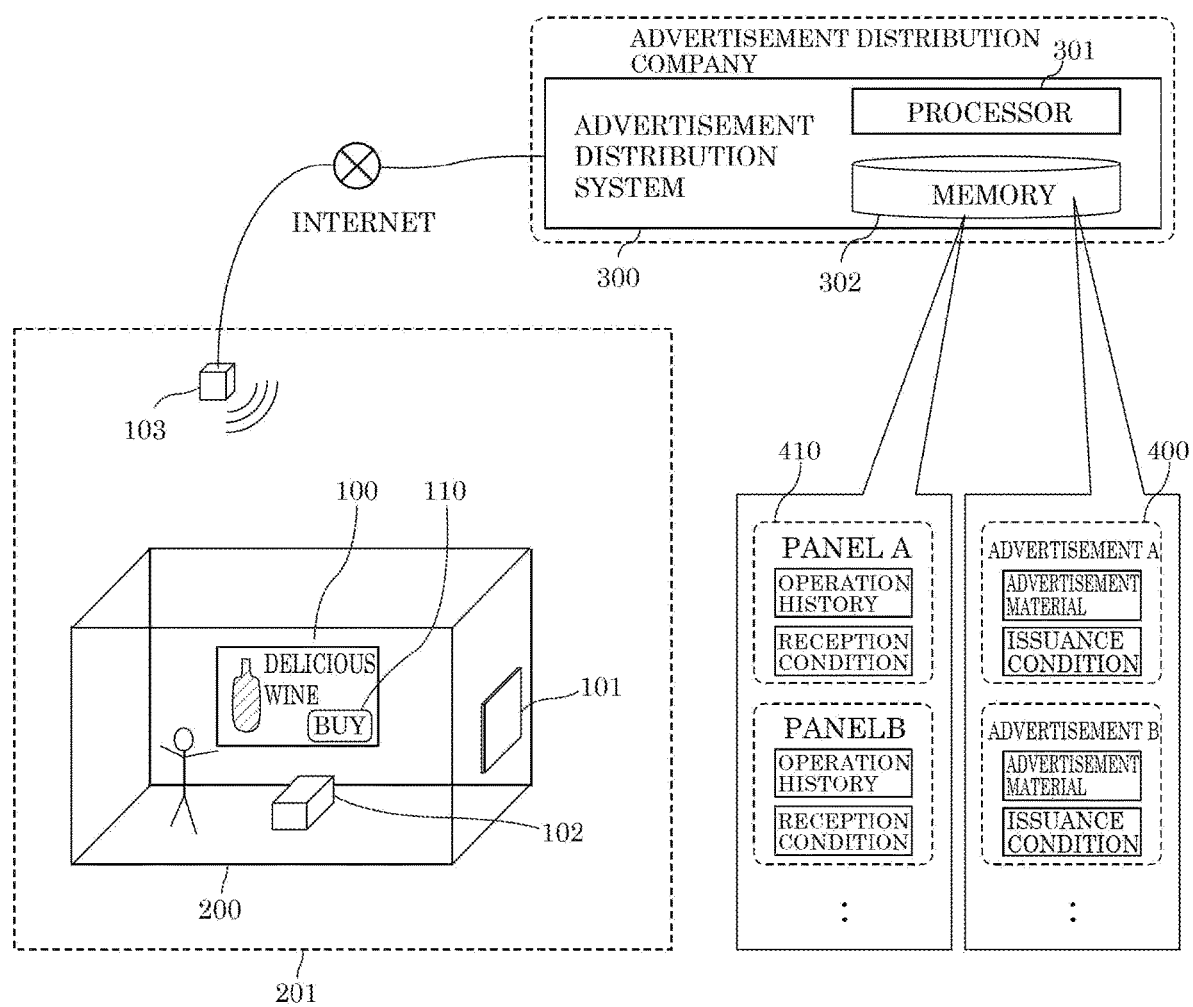
FIG. 6 is an overall view of an advertisement distribution service according to a modification of Embodiment 1.

FIG. 6 illustrates an image of an advertisement distribution service according to the modification of Embodiment 1.

In the present modification, memory 302 stores panel data 410, which is information related to a plurality of panels including panel A and panel B, in addition to advertisement data 400. In panel data 410, operation history of panel A, setting information on a reception condition for advertisements, and the like are recorded being associated with one another.

Advertisement distribution system 300 has panel data 410 that is obtained by making a database of specific settings and operation history of each panel, which enables advertisement distribution system 300 to determine what advertisement is distributed to specified panel 100 in what case so that coordination between the advertisement and a dwelling space will be improved.

Additionally, panel 100 includes a screen and a touch sensor that receives a touch operation on the screen from a user. Note that a user interface of panel 100 is not limited to a touch user interface. For example, a touchless interface with gesture recognition may be used. Alternatively, as the user interface, a technique in which a sense of touch of a touch operation is reproduced at a remote place by haptic technology may be adopted. In addition, a voice user interface that receives an operation of a user in a form of utterance/conversation/sound. That is, it will suffice that panel 100 has a function that allows a user to operate a graphical user interface (GUI) such as purchase button 110 when the GUI is displayed on panel 100.

Figure 7:
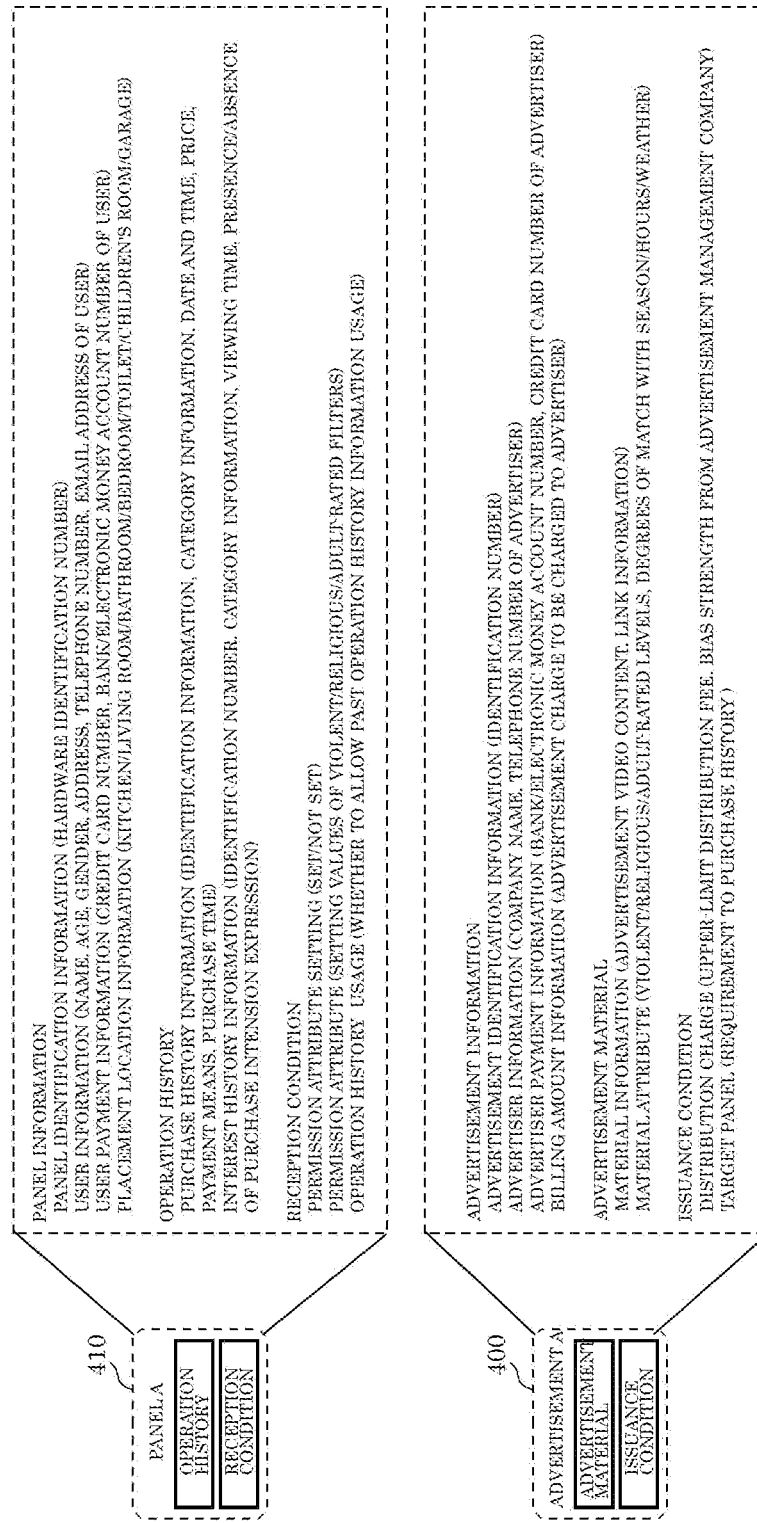
FIG. 7 illustrates an example of panel data and advertisement data in the modification of Embodiment 1.

FIG. 7 illustrates an example of contents of panel data 410 and advertisement data 400. Panel data 410 and advertisement data 400 illustrated here are managed in a data format that is easy to handle for a system configuration, specifically a binary format, a CSV format, JSON format, relational database format, or the like.

First, a content of panel data 410 that is managed for each panel 100 will be described.

Panel data 410 includes three kinds of information: panel information, operation history, and reception conditions.

An example of panel information will be described.

Panel identification information: information for identifying an individual panel such as a hardware identification number.

User information: a name, age, gender, address, telephone number, and email address of a user for each dwelling space (or living space or room) where the panel is placed.

User payment information: a credit card number of the user or an account number of the user in a bank or an electronic money.

Placement location information: information indicating a location where the panel is placed. For example, identification information on a living space such as a kitchen, a living room, a bathroom, a bedroom, a toilet, a children's room, and a garage.

An example of the operation history will be described. Pieces of information included in the operation history correspond to attributes of an indoor space.

Purchase history information: identification information on items/services that have been purchased via this panel, category information on the items/services such as household appliances, household appliance consumables, and foods, dates and times being information on time points at which payments of the purchases are made, amounts being purchase amounts, payment means indicating means used for the payment (credit card, collect on delivery, etc.), purchase times taken for the purchases from the first accesses to information related to the items/services.

Interest history information: identification information related to items/services on which actions such searches and detailed explanation displays have been made via this panel, category information, viewing times being information on times at which these explanations are viewed, presences or absences of purchase intension expressions each indicating whether an intention is expressed for a purchase (e.g., whether a purchase button is clicked, whether an item/service is added to a shopping cart).

An example of the reception conditions will be described. Pieces of information included in the reception conditions correspond to attributes of an indoor space.

Permission attribute settings: settings indicating whether permission attributes described below have already been set by a user or not (as default value).

Permission attributes: setting values (0 or less) of levels of a violent filter, a religious filter, and an adult-rated filter against an advertisement to be received by this panel.

Operation history usage: whether operation history information on this panel may be used for future advertisement displaying.

Next, a content of advertisement data 400 that is managed for each advertisement will be described.

Advertisement data 400 includes three kinds of information: advertisement information, an advertisement material, and issuance conditions.

The advertisement information includes the following information.

Advertisement identification information: an identification number for identifying this advertisement.

Advertiser information: a company name and a telephone number of an advertiser of this advertisement.

Advertiser payment information: an account number in a bank/electronic money, or a credit card number of the advertiser of this advertisement.

Billing amount information: price information on an advertisement charge that is to be charged to the advertiser for this advertisement.

The advertisement material includes the following information.

Material information: video audio content data on this advertisement and link information on a URL or the like that is embedded in the content or displayed together with the content.

Material attribute: numeric values (zero or greater) of violent/religious/adult-rated levels of an expression of this advertisement, a season (month and day)/hour (morning, noon, evening, midnight, etc.) appropriate to this advertisement, data on a degree of match (integer) for evaluating weather in an area of the panel (clear/cloudy/rainy, temperature, humidity, wet-bulb globe temperature (WBGT), etc.).

The issuance condition includes the following information.

Distribution charge: an upper-limit distribution fee indicating a maximum advertisement charge that this advertiser can afford per advertisement, and a degree of improperness determined on this advertisement by an advertisement distribution company (bias strength number).

Target panel: requirements such as the number of purchase history and total purchase amount information necessary to distribute this advertisement to the panel.

As described above, in panel data 410, the operation history is accumulated for each panel, and in advertisement data 400, many pieces of attribute information for increasing a matching property to panel 100 to display an advertisement are registered. Advertisement distribution system 300 manages these items of data collectively to pursue an optimum match between a panel and an advertisement.

Figure 8:
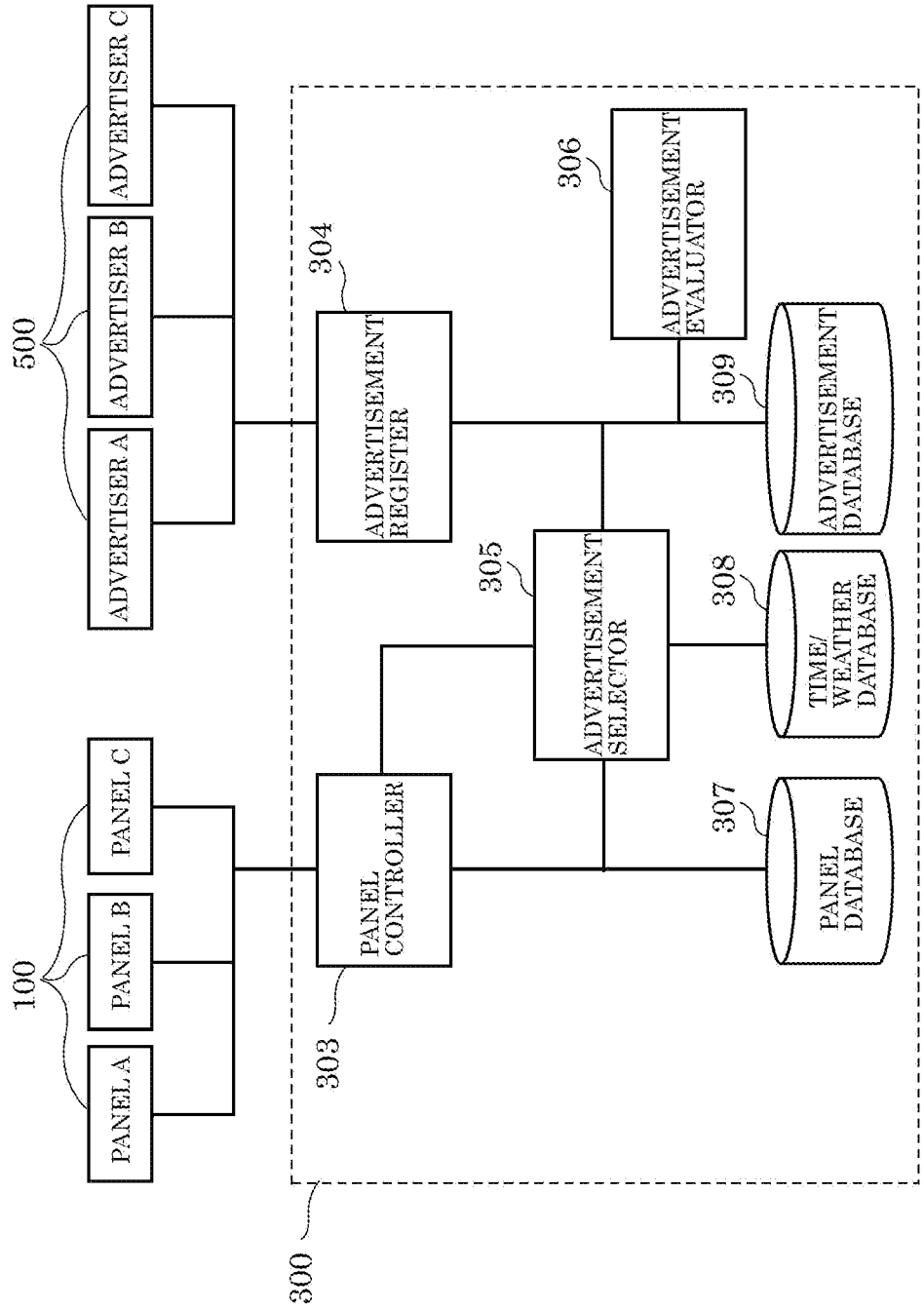
FIG. 8 is a block diagram illustrating a functional configuration of an advertisement distribution system according to the modification of Embodiment 1.

FIG. 8 is a block diagram illustrating a functional configuration of advertisement distribution system 300 according to a modification of Embodiment 1.

Advertisement distribution system 300 is connected to many panels 100 (panel A, panel B, panel C, . . . ) and includes panel controller 303 that control display screen of each panel 100. Panel controller 303 has a function of receiving an operation to each panel and, in response to the reception, updating a display screen to an appropriate content, as well as a function of updating panel data 410 described above in response to the operation as appropriate and recording panel data 410 to panel database 307.

At the same time, advertisement distribution system 300 is connected to terminals 500 of various advertisers (advertiser A, advertiser B, advertiser C, . . . ) and includes advertisement register 304 that accepts an advertisement registration. Advertisement register 304 has a function of receiving information related to an advertisement from terminal 500 of each advertiser and registering the information to advertisement database 309 as a new item of advertisement data 400. Advertisement register 304 additionally has a function of accessing an account of an advertiser to collect an uncollected advertisement charge.

Advertisement data 400 that has just been registered to advertisement database 309 has no material attributes set to the advertisement. Advertisement evaluator 306 adds, to advertisement data 400, a digitized result of evaluating an expression of the advertisement made by an advertisement distribution company, a third-party organization, or an image processing system that can determine an expression of a content with high accuracy. Advertisement data 400 is thereby completed and recognized by advertisement distribution system 300 as a new advertisement candidate.

Advertisement selector 305 has a function of accessing panel database 307 and advertisement database 309, as well as time weather database 308 that stores a time and weather information on a location where the panel is placed, so as to determine what advertisement should be presented to what panel under what condition.

In addition, advertisement selector 305 reads information related to the selected advertisement according to the determine conditions (time, etc.) from advertisement database 309 and sends the information to panel controller 303 together with information on the target panel and information on a displaying condition. Upon receiving this, panel controller 303 controls panel 100 such that the advertisement is displayed according to the specified condition.

These functional blocks of advertisement distribution system 300 are implemented by processor 301 and/or memory 302. For example, executing instructions and/or a software program stored in memory 302, processor 301 implements the function of each functional block. Note that processor 301 and memory 302 may be mounted in one device or may be mounted separately in a plurality of devices. In addition, each functional block of advertisement distribution system 300 may be implemented in a form of a dedicated electronic circuit.

FIG. 9A illustrates an example of a relation between past panel operation history and base fees corresponding to distribution conditions (advertisement charges) in the modification of Embodiment 1.

In FIG. 9A, for example, in morning hours from 6:00 to 12:00, a frequency of past purchase via this panel, as a quantitative index, is 50. This purchase frequency increases to 100 in afternoon hours (12:00 to 18:00), reaches a maximum of 500 in night hours (18:00 to 24:00) maximum, and reaches a minimum of 0 in midnight hours (24:00 to 6:00).

The purchase frequency is a numerical index obtained by dividing a total amount of past purchases of items/services in a given time frame by a total usage time in the time frame and multiplying a result of the division by a predetermined coefficient. A large value of this purchase frequency means that many purchases are made (a sum of amounts of the purchases is large) in the given time frame in the past. Needless to say, conversely, a small value of the purchase frequency means that there is not many purchase history in the time frame.

In other words, in a time frame with a high purchase frequency, there can be a high possibility of purchasing items/services via the panel. Therefore, an advertisement charge in the time frame can be increased.

In FIG. 9A, the standard base fee (C0) may be calculated for each hour as a value resulting from adding a purchase frequency of a corresponding time frame to MinC0, which is a minimum amount set by advertisement distribution system 300. In this case, C0 may change based on hours.

Similarly, the higher base fee (C) may be calculated for each hour as a value resulting from adding a purchase frequency of a corresponding time frame to MinC1, which is a minimum amount set by advertisement distribution system 300. In this case, C1 may change based on hours.

As above, according to FIG. 9A, the base fee is changed based on a frequency of purchase via panel 100 disposed in an indoor space. Advertisement distribution system 300 sums up past total purchase amounts for each time frame for each panel 100 to calculate a base fee of an advertisement charge for each time frame, so as to set the base fee while maintaining economic rationality.

Note that although the past total purchase amount is used in the above description, this is not limitative, and the number of past purchases, an average amount of past purchases, a total purchase amount during a certain past period, the number of purchases during a certain past period, an average amount of purchases during a certain past period, a total purchase amount during the same period in the past (e.g., several days including the same day a year ago), the number of purchases during the same period in the past, an average amount of purchases during the same period in the past, or the like may be used.

Advertisement distribution system 300 according to the present modification can increase (a base fee of) advertisement charge for hours when purchases of items or services tend to occur with panel 100 on which an advertisement is displayed or a dwelling space where panel 100 is placed, based on a probability of occurrence of the purchases.

FIG. 9B illustrates an example of a relation between base fees and reaction information on users on the Internet in the modification of Embodiment 1. Here, the reaction information indicates a result of sentiment analysis. In FIG. 9B, comments of users on the Internet about a term "automobile" related to a content of an advertisement are extracted, and whether each of the comments is positive or negative is counted. For example, whether each of the comments is positive or negative is counted for each predetermined period. In the example in FIG. 9B, whether each of the comments is positive or negative is counted every month. The predetermined period may be set to be a period such as a day, a week, and three months. The comments of users on the Internet include posts on a social network service, news stories, and the like. The reaction information includes relations between a plurality of terms and results of the sentiment analysis on the terms. Results of the sentiment analysis are positive, negative, and neither positive nor negative. The reaction information may include only terms for which a predetermined number or more of comments are counted. Alternatively, the reaction information may include only terms for which negative comments outnumber positive comments.

In FIG. 9B, whether a comment is positive or negative is determined based on whether any positive adjective or any negative adjective is included in each of texts including the term "automobile" that are extracted from the Internet. Adjectives having positive meanings or adjectives having negative meanings are specified in advance and recorded in a memory available to advertisement distribution system 300.

Base fees can be set as in FIG. 9A. For example, the standard base fee (C0) may be calculated for each period as a value resulting from adding a frequency of negative comments during the period to MinC0, which is a minimum amount set by advertisement distribution system 300. In this case, C0 may change based on periods. The frequency of negative comments is expressed as: the number of negative comments/(the number of positive comments+the number of negative comments).

Similarly, the higher base fee (C1) may be calculated for each period as a value resulting from adding a frequency of negative comments during the period to MinC1, which is a minimum amount set by advertisement distribution system 300. In this case, C1 may change based on periods. For example, an advertisement can include a plurality of terms included in the reaction information. In a case where an advertisement includes a plurality of terms that are included in the reaction information, an average value of standard base fees calculated (C0, C1) of the terms may be used. Alternatively, a standard base fee (C0, C1) of a term that is high in a list of frequencies of negative comments may be used.

In a case where an advertisement includes a word having a high frequency of negative comments, the advertisement has a good chance of catching eyes of a resident but includes a content that makes a bad impression on the resident. When a content making such an impression on the resident is provided, the advertisement does not match the resident, and moreover the resident can have a bad impression of the system. Therefore, by setting a standard base fee to be high, the advertisement becomes an advertisement that an advertiser wants to provide to the resident despite a high cost to pay. Therefore, it can be said that the advertisement matches the resident and is unlikely to adversely affect the resident.

In addition, providing an advertisement including a word having a high frequency of negative comments to a resident can cause the resident to have a bad impression of even an advertiser of the advertisement, which can adversely affect the advertiser. Even in a case where an advertiser unintentionally uses a term having a large number of negative comments, the advertiser can stop distribution of an advertisement by setting a high base fee (C1) so that the base fee exceeds an upper-limit distribution fee set by the advertiser.

As above, according to FIG. 9B, a base fee is changed based on a result of social media sentiment analysis on terms related to a content of an advertisement. For example, a base fee is changed such that the base fee is increased as a frequency of negative comments increases as a result of the social media sentiment analysis, but the present disclosure is not limited to this. For example, a base fee may be changed such that the base fee is decreased as a frequency of positive comments increases as a result of the social media sentiment analysis. Alternatively, a frequency of positive comments and a frequency of negative comments may be both used. Alternatively, in place of the frequencies of positive comments and negative comments, the number of positive comments or the number of negative comments may be used. Here, as a term related to a content of an advertisement, for example, a term indicating a subject of the advertisement, a term indicating a person and/or a place shown in the advertisement, a term indicating an advertiser, or any combinations of these may be used, but the present disclosure is not limited to this.

FIG. 10 illustrates an example of a relation between advertisement charges and matching properties of attributes of a panel and advertisements in the modification of Embodiment 1.

According to FIG. 10, values of a violent filter strength, a religious filter strength, and an adult-rated filter strength that are set to permission attributes included in reception conditions of panel data 410 are −5, −3, and −3, respectively. When a value of any of these filter strengths is low, the value indicates that a user of the panel has a strongly negative impression to the corresponding attribute. In other words, an intention of the user of the panel of being unwilling to receive an advertisement or information having an attribute for which the value of the filter strength is low is expressed in a digitized manner.

Subsequently, season, hour, and weather attributes are set to be one, which is a default value for the panel.

For such a panel, three advertisements are exemplified to confirm their coordination.

For first advertisement A, violent, religious, and adult-rated levels of material attributes in data on this advertisement are set to be 5, 0, and 3. A high value of any of the levels means that a level of the corresponding attribute of the advertisement is high. That is, FIG. 10 illustrates that advertisement A contain an expression that is determined to be very high in violence and accordingly adult-rated but is determined to be unreligious.

In addition, degrees of match with season, hour, and weather are set to be 0, −4, and 0, respectively, which means that advertisement A is evaluated to have no correlation to season and weather but not to match with an hour of 17:00, which is an expected time of distribution of the advertisement.

Since advertisement A is determined to be high in violence and adult-rated, a degrees of match with 17 o'clock is set to be −4 because advertisement A may be seen by children at this hour.

In this manner, advertisement data 400 is given degrees of match with season, hour, and weather for detailed dates and times. Although not illustrated, advertisement data 400 includes detailed settings such that, for example, a degree of match with an hour of 17:00 in evening is −4, a degree of match with an hour of 02:00 in midnight is 5, and a degree of match with an hour of 8:00 in morning is −8. Degrees of match are determined based on times of advertisement distribution.

To measure a coordination (matching score) between this panel and advertisement A, advertisement selector 305 multiplies attribute values by coefficients and sums up results of multiplication to calculate the matching score. That is, in a case of advertisement A, the matching score is calculated as follows.

Matching score of advertisement $A = -5*5 - 3*0 - 3*3 + 1*0 + 1*(-4) + 1*0 = -38$ A base fee that constitutes a distribution condition (advertisement charge) of advertisement A is C1 since advertisement A contains a violent and adult-rated expression. A bias strength from the advertisement distribution company is evaluated to be C2; when the bias strength is used as an additional fee as it is, the advertisement charge is determined to be C1+C2.

An upper-limit distribution fee set by an advertiser of advertisement A is P1, and thus P1≥C1+C2 needs to be established so that advertisement A remains to be an advertisement candidate to be distributed. If P1<C1+C2, advertisement A is excluded from advertisement candidates.

Similarly, matching scores and distribution conditions (advertisement charges) of advertisement B and advertisement C are calculated. Here, the matching scores are calculated from six pieces of attribute information including violence, religion, adult-rated, season, hour, and weather attributes. However, the present disclosure is not limited to this calculation, and attribute information other than the attribute information described here may be used.

For example, in a case where a time to distribute an advertisement is at 17:00 on August 3rd, weather at that time at a location where the panel is placed is clear, and a wet-bulb globe temperature (WBGT) is 32 degrees, on the assumption that P1≥C1+C2, P2≥C0, P3<C0, advertisement B, which has a highest issuance condition (advertisement charge) and the issuance condition (advertisement charge) is equal to or less than an upper-limit distribution fee, is selected from among advertisements having a highest matching score (advertisement B and advertisement C).

Conversely, an advertisement having a highest matching score may be selected from among advertisements having a highest issuance condition (advertisement charge); in this case, advertisement A is selected.

As a criterion for selecting an advertisement, instead of selecting an advertisement having either a highest matching score or a highest issuance condition (advertisement charge), an advertisement having a high total value of values of a matching score and an issuance condition (advertisement charge) multiplied by weight coefficients may be selected. Alternatively, an advertisement having a high total value of values of a matching score, an issuance condition (advertisement charge), and an upper-limit distribution fee multiplied with weight coefficients may be selected.

In other words, an advertisement to be distributed may be selected using two parameters: a matching score and an issuance condition (advertisement charge), or an advertisement to be distributed may be selected using three parameters: a matching score, an issuance condition (advertisement charge), and an upper-limit distribution fee.

Alternatively, in place of an upper-limit distribution fee, a difference value between an upper-limit distribution fee and an advertisement charge may be used.

Figure 11:
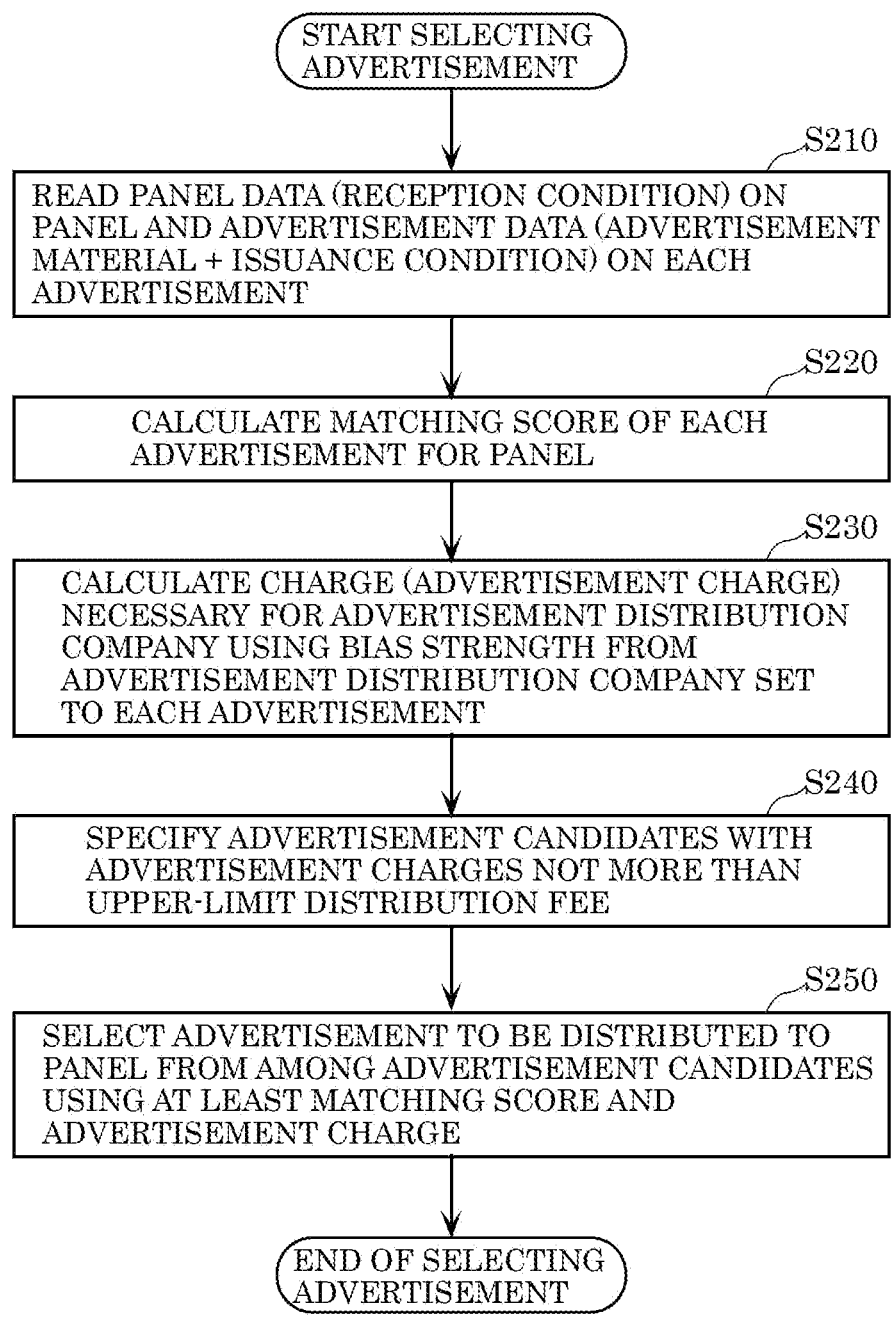
FIG. 11 is a flowchart illustrating a process of selecting an advertisement to be distributed in the modification of Embodiment 1.

FIG. 11 is a flowchart illustrating a process of selecting an advertisement to be distributed in the modification of Embodiment 1.

As illustrated in FIG. 11, advertisement selector 305 reads panel data 410 related to a specific panel and advertisement data 400 on each advertisement to select an advertisement for the specified panel (S210). Next, advertisement selector 305 calculates a matching score of each advertisement for the panel, as described above (S220). Additionally, advertisement selector 305 calculates what is a distribution condition (advertisement charge), for each advertisement using a bias strength from an advertisement distribution company (S230). That is, advertisement selector 305 calculates an additional fee of each advertisement to calculate the advertisement charge (=base fee+additional fee). Advertisement selector 305 selects advertisement candidates in which advertisement charges are equal to or less than upper-limit distribution fee of the advertisement candidates (S240), and selects an advertisement to be distributed to the panel from among the determined advertisement candidates using at least matching scores and advertisement charges of the advertisement candidates (S250), by which the process of selecting an advertisement is finished.

Note that an advertisement may be distributed together with link information such as purchase button 110.

Such an advertisement exerts a high impact of advertising an item/service because the item/service can be purchased easily when the advertisement is viewed. Panel data 410 includes user payment information (credit card information) and user information (name, address, telephone number), and advertisement distribution system 300 can provide a system in which a purchase payment is completed when a user simply clicks purchase button (110) on the panel.

For that reason, in place of a bias strength from an advertisement distribution company, an additional fee (C3) may be added to a base fee when a URL link is embedded.

Alternatively, as an additional fee, a bias strength (C2) from an advertisement distribution company and an embedded URL link (C3) may be both applied at the same time. For example, an additional fee (C2) based on a bias strength (C2) may be applied to an advertisement because the advertisement distribution company determines that the advertisement does not match an advertisement service (e.g., the advertisement contains an expression high in violence), and at the same time, a URL link embedding additional fee (C3) may be applied to the advertisement because link information is embedded in the advertisement. In this case, an issuance condition (advertisement charge) is calculated to be C1+C2+C3. This example will be described with reference to FIG. 12. In FIG. 12, the same case as in FIG. 10 is assumed, and thus matching scores and upper-limit distribution fees are not changed, but issuance conditions (advertisement charges) differ based on whether an embedded URL link is present. Specifically, for advertisement A, in addition to a base fee (C) and an additional fee (C2) due to a bias strength, a URL link embedding additional fee (C3) is added to an advertisement charge.

As above, advertisement distribution system 300 according to the present modification can (e) change a base fee based on a frequency of purchase via panel 100 disposed in an indoor space and, in (c), can select an advertisement to be provided from among a plurality of advertisements based on a sum of the base fee changed and the additional fee calculated.

With this configuration, a base fee can be changed based on a probability that distribution of an advertisement leads to a purchase of a subject of the advertisement, and an advertisement can be distributed at a distribution charge appropriate to economic rationality.

Alternatively, advertisement distribution system 300 according to the present modification can (f) change a base fee based on a result of social media sentiment analysis on a term related to a content of a first advertisement and, in (c), can select an advertisement to be provided from among a plurality of advertisements based on a sum of the base fee changed and the additional fee calculated.

With this configuration, a base fee can be changed based on a result of social media sentiment analysis, and thus an advertisement appropriate to sentiment on a network can be distributed at an appropriate distribution charge. For example, a base fee of an advertisement related to a term associated with positive sentiment on a network can be increased, so that an impact of advertising can be increased.

Embodiment 2

Next, Embodiment 2 will be described. The present embodiment is different from Embodiment 1 described above mainly in that a price of distribution of an advertisement is determined based on a matching level between attributes of the advertisement and attributes of an indoor space stored in a memory or obtained by a sensor disposed in the indoor space. The present embodiment will be described below mainly about points different from Embodiment 1 described above, with reference to the drawings.

Figure 13:
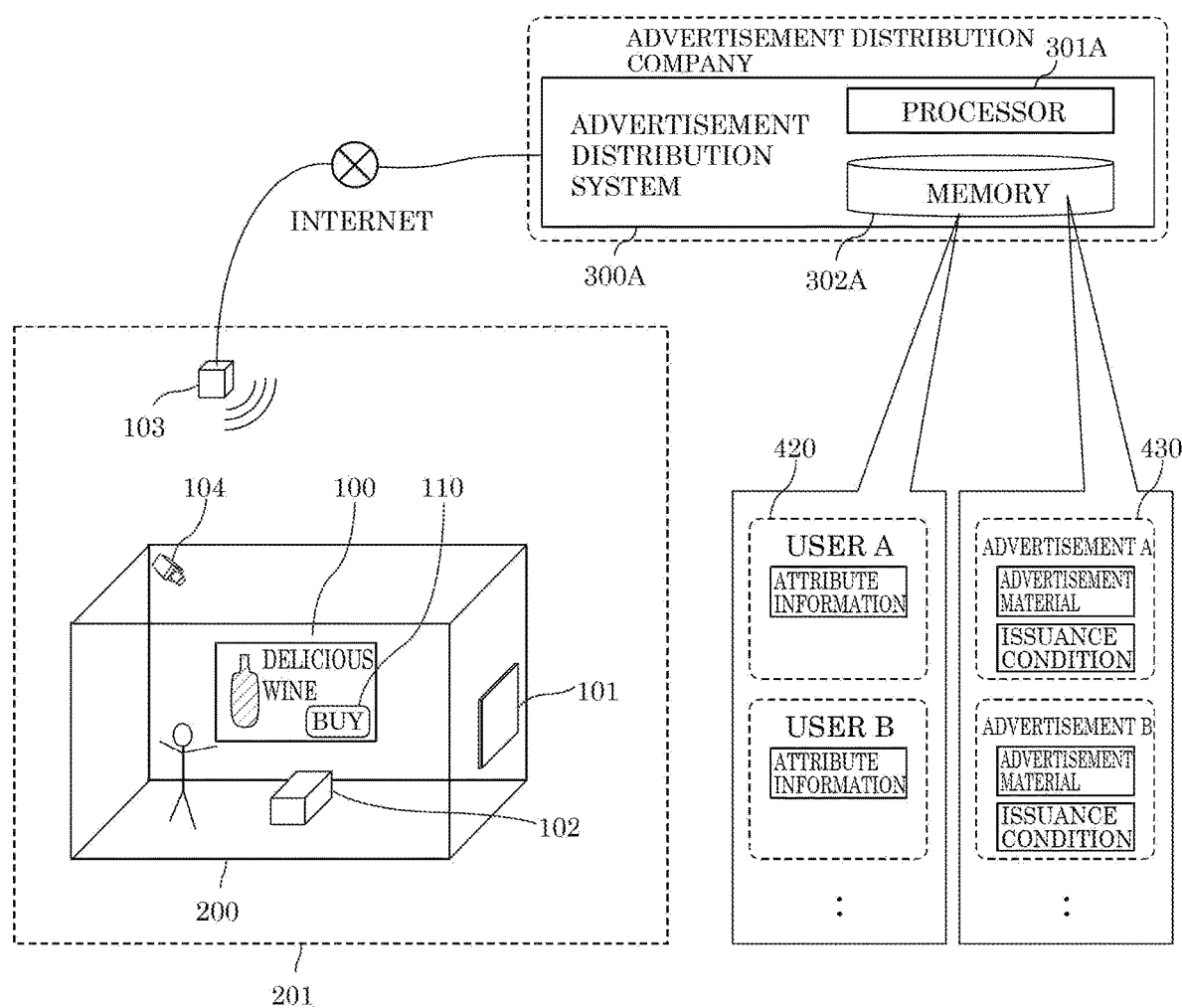
FIG. 13 is an overall view of an advertisement distribution service according to Embodiment 2.

FIG. 13 is an overall view of an advertisement distribution service according to Embodiment 2. In the present embodiment, sensor 104 is disposed in living room 200. Sensor 104 senses a physical quantity of living room 200. Sensor 104 is, for example, an image sensor and captures an image of an inside of living room 200. Note that sensor 104 is not limited to an image sensor. Sensor 104 may be, for example, an infrared sensor, a visible light sensor, an ultrasonic sensor, a weight sensor, or any combination of an infrared sensor, a visible light sensor, an ultrasonic sensor, and a weight sensor.

Advertisement distribution system 300A according to the present embodiment includes processor 301A and memory 302A.

Processor 301A is an electronic circuit that executes instructions and/or a software program stored in memory 302A. Executing the instructions and/or the software program stored in memory 302A, processor 301A implements an advertisement distribution service according to the present embodiment. Various kinds of processing performed by processor 301A will be described below with reference to FIG. 15.

Memory 302A is implemented in a form of, for example, a semiconductor memory and/or a disk drive. Memory 302A stores indoor space data 420 and advertisement data 430.

Indoor space data 420 is created based on, for example, sensor values obtained by sensor 104 disposed in an indoor space. The indoor space is a term implying dwelling spaces and covers, in addition to dwelling spaces, office spaces and stores, spaces for relaxation, and a food court in a commercial facility. Indoor space data 420 includes, for example, various kinds of information indicating circumstances of the indoor space as attributes of the indoor space, as illustrated in FIG. 14A. According to FIG. 14A, indoor space data 420 includes identification information on a user sensed by sensor 104, information related to the indoor space (living location), personal information on the user in the indoor space (gender, age, household composition, occupation), and circumstance information on an inside of the indoor space (hours, place of stay, apparatuses/household equipment in use, actions).

Here, the household composition indicates whether there is any preschool child in persons living in the indoor space. The hours indicate time segments in a day. The place of stay is pieces of information that specify an indoor space where a user stays. The apparatuses/household equipment in use indicate apparatuses or household equipment used by a user. The actions indicate actions of a user such as watching TV, having a meal, and browsing the Internet. The circumstance information on the inside of the indoor space is obtained based on an output signal from sensor 104.

Advertisement data 430 includes pieces of information related to attributes of each of a plurality of advertisements. Here, the attributes of each advertisement indicates attributes of the indoor space that are appropriate to distribution of the advertisement. Advertisement data 430 includes information related to an indoor space (living location), personal information on a user in the indoor space (gender, age, household composition, occupation), and circumstance information on an inside of the indoor space (hours, place of stay, apparatuses/household equipment in use, actions), as illustrated in FIG. 14B. According to FIG. 14B, advertisement A is an advertisement related to, for example, an event for children held in a shopping mall in Kadoma city on a day of X in a month of X. To such advertisement A, a living location "Kadoma city", ages "30s, 40s, 50s", a household composition "with preschool children", hours "22:00 to 24:00 in the evening", apparatuses/household equipment "terminal", and an action "Internet" are set as attributes of an indoor space appropriate to distribution of the advertisement.

Here, a process by advertisement distribution system 300A configured as such will be described with reference to FIG. 15 to FIG. 18. FIG. 15 is a flowchart illustrating a process by advertisement distribution system 300A according to Embodiment 2.

As illustrated in FIG. 15, processor 301A first obtains attributes of an indoor space, which are stored in memory 302A or obtained by sensor 104 disposed in the indoor space (S310). For example, processor 301A refers to indoor space data 420 to obtain the attributes of the indoor space.

Next, processor 301A receives a bid price of a first advertisement included in a plurality of advertisements (S320). As the bid price of the first advertisement, for example, processor 301A receives a bid price of advertisement A from terminal 500 of advertiser A. The bid price is a standard price that an advertiser has an intention of paying for distribution of an advertisement.

Processor 301A calculates an appraised price changed from the bid price, based on a matching level between attributes of the first advertisement stored in memory 302A and attributes of the indoor space obtained in step S310 (S330). For example, to calculate an appraised price of advertisement to be distributed to an indoor space, processor 301A calculates a value of a matching level between attributes of the advertisement and attributes of the indoor space for each of a plurality of advertisements. Processor 301A then calculates an appraised price of each of the plurality of advertisements based on the value of the matching level calculated.

Here, an example of calculating a value of a matching level will be described with reference to FIG. 16. FIG. 16 is a table for describing an example of a matching level in Embodiment 2. FIG. 16 illustrates matching scores between attributes of an indoor space of user A and attributes of advertisement A. Here, a total value of the matching scores serves as a value of a matching level between the attributes of the indoor space and the attributes of the advertisement.

For the calculation of the matching scores, a matching filter is used. The matching filter is stored in, for example, memory 302A in advance and has a set of coefficients corresponding to a plurality of attributes. Note that the matching filter may be common to a plurality of advertisements, or separate matching filters may be used for a plurality of advertisements. In addition, the coefficients of the filter are not limited to integers, and fractional values may be used.

When an attribute of an indoor space matches an attribute of an advertisement, a coefficient of the matching filter corresponding to the attribute reflects in a form of a matching score. For example, regarding a living location, an attribute of the indoor space of user A "Kadoma city" matches an attribute of advertisement A "Kadoma city", and thus a coefficient of the matching filter "10" is used as a matching score. In this manner, whether an attribute has a match between the indoor space and the advertisement is determined for each attribute, and when the attribute has the match between the indoor space and the advertisement, a coefficient corresponding to the attribute reflects in a form of a matching score. Here, a total value of matching scores obtained in this manner can be used as a value of a matching level between the attributes of the indoor space and the attributes of the advertisement.

Next, how to calculate an appraised price based on a total value of matching scores obtained in this manner will be described with reference to FIG. 17 and FIG. 18. FIG. 17 is a table for describing an example of a correspondence relation between matching score and appraised price in Embodiment 2. FIG. 18 is a table for describing an example of an appraised price in Embodiment 2.

In FIG. 17, ranges of a matching score are associated with appraised prices. Here, the appraised price is a price obtained by changing a bid price when necessary. That is, the appraised price is a price changed from a bid price when necessary.

For example, according to FIG. 17, when a total value of matching scores is 20 or greater, an appraised price is calculated as a result of adding predetermined price a to a bid price. For example, when a total value of matching scores is 10 or greater and less than 20, a bid price is used as it is as the appraised price. For example, when the total value of matching scores is 0 or greater and less than 10, the appraised price is calculated as a result of subtracting a predetermined price 8 from the bid price. For example, when the total value of matching scores is less than 0, the appraised price is not set.

As described above, in the present embodiment, an appraised price is calculated using a relation in which the appraised price is not decreased with an increase in a total value of matching scores (i.e., a value of a matching level between attributes of an indoor space and attributes of an advertisement). Note that the table of FIG. 17 is an example of the relation between matching scores and an appraised price, and the present disclosure is not limited to this.

Based on such a relation between matching scores and an appraised price, an appraised price is calculated from matching scores and a bid price. In FIG. 18, for three advertisements (advertisement A, advertisement B, and advertisement C), appraised prices are calculated from matching scores and bid prices, with reference to FIG. 17. For example, advertisement A has a matching score of "16", and thus a bid price "110" is used as it is as an appraised price.

Advertisement B has a matching score of "20", and thus a (=20) is added to a bid price "100", and "120" is used as an appraised price. Advertisement C has a matching score of "−5", and thus an appraised price is not set.

Here, return to the description of the flowchart of FIG. 15. Based on the appraised price calculated, processor 301A selects an advertisement to be provided in the indoor space from among the plurality of advertisements (S340). For example, processor 301A selects an advertisement having a highest appraised price from among the plurality of advertisements. The method for selecting an advertisement is not limited to this. For example, for the selection of an advertisement, an upper-limit distribution fee and/or a matching score may be used in addition to an appraised price as in Embodiment 1.

Next, processor 301A provides the selected advertisement to the indoor space (S350) and finishes the process. For example, processor 301A outputs, to panel 100 disposed in the indoor space, an instruction to display the selected advertisement on panel 100. An advertisement is thereby provided to an indoor space. For example, after an advertisement is provided to an indoor space in this manner, a bid price of the advertisement is charged as an advertisement distribution charge to an advertiser. Even when an advertisement has a low bid price, an appraised price of the advertisement is thereby increased and thus can be provided when the advertisement matches users. Therefore, using an appraised price can guide an advertiser to provision of an advertisement under a condition that matches users. As a result, a possibility that users can view an advertisement having a high matching level increases.

As described above, advertisement distribution system 300A according to the present embodiment is advertisement distribution system 300A that distributes an advertisement to an indoor space. Advertisement distribution system 300A includes: processor 301A: and memory 302A that stores information about an attribute of each of a plurality of advertisements, in which processor 301A: (a) obtains an attribute of the indoor space which is stored in memory 302A or obtained by sensor 104 disposed in the indoor space; (b) receives a bid price of a first advertisement included in the plurality of advertisements (c) calculates an appraised price changed from the bid price, based on a matching level between an attribute of the first advertisement stored in memory 302A and the attribute of the indoor space; (d) selects an advertisement to be provided from among the plurality of advertisements based on the appraised price; and (e) outputs an instruction to provide, to the indoor space, the advertisement selected.

With this configuration, an advertisement can be selected based on an appraised price that is calculated based on a matching level between attributes of the advertisement and attributes of an indoor space. Therefore, an advertisement having a high matching property to circumstances of an indoor space can be provided to the indoor space.

Alternatively, in advertisement distribution system 300A according to the present embodiment, a first advertisement and an indoor space each may have a plurality of attributes, and in (c) described above, whether an attribute has a match between the first advertisement and the indoor space may be determined for each of the plurality of attributes, and when the attribute has the match, a value of a matching level may be increased or decreased.

With this configuration, the value of the matching level can be increased or decreased using the plurality of attributes, so that the value of the matching level can be calculated with higher accuracy.

Alternatively, in advertisement distribution system 300A according to the present embodiment, a coefficient may be associated with each of the plurality of attributes in advance, and in (c) described above, when the attribute has the match, the value of the matching level may be increased or decreased using a coefficient corresponding to the attribute.

With this configuration, a value of a matching level can be calculated using a coefficient associated with each of a plurality of attributes. Therefore, values corresponding to degrees of influence of attributes with respect to a matching level can be used as the coefficients, and weights can be assigned to the attributes. As a result, the value of the matching level can be calculated with higher accuracy.

Alternatively, processor 301A can perform the process with S310 and S320 switched. In addition, in S320, processor 301A may obtain a bid price of a first advertisement that is received in advance, from the memory.

Modification of Embodiment 2

Next, a modification of Embodiment 2 will be described with reference to the drawings.

The attributes of the indoor spaces and the advertisements described in Embodiment 2 described above are an example and are not limited to this. For example, presence of child that indicates whether a child is present in an indoor space may be used as an attribute. For example, in FIG. 19, a filter coefficient "−3" is applied to the presence of child, and a matching score of advertisement A for an indoor space where a child is present is decreased. Alternatively, for example, presence of a plurality of users may be used as an attribute. In a case where a plurality of users live in an indoor space, some advertisement has an attribute that has a high relevance to certain users and that makes the users not want other users to see the advertisement. An example of the advertisement is an advertisement of an item or a service that is related to a hobby of the users and that the other users are less interested in. For example, for male users who are in their 30s to 60s, an advertisement of golf clubs and an advertisement of playing on golf course are possible advertisements. For example, for female users who are in their 20s to 50s, an advertisement of a bag and an advertisement of receiving a beauty salon treatment are possible advertisements.

Alternatively, for example, a combination of the attributes in Embodiment 2 described above may be used as an attribute. For example, in FIG. 20, a combination of hours and an action is used as an attribute. Specifically, in a case where the hours are "morning" and the action is "cooking", a filter coefficient "−3" is applied.

Note that the indoor space data shown in Embodiment 2 described above is an example and is not limited to this. For example, as illustrated in FIG. 21, the indoor space data may be managed on a basis of family living in an indoor space rather than user. In this case, when an attribute of any member of family matches an attribute of an advertisement, a filter coefficient may reflect in a form of a matching score. Alternatively, the indoor space data may be managed on a basis of panel.

Embodiment 3

Next, Embodiment 3 will be described. In the present embodiment, types of a service of a service providing system that provides an advertisement distribution service will be described.

[Overall View of Service Provided]

Figure 22A:
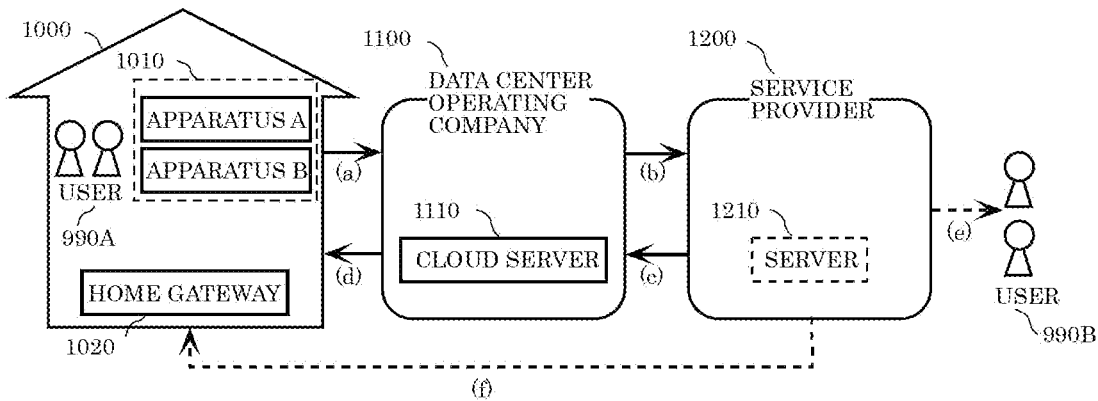
FIG. 22A is an overall view of a service providing system in Embodiment 2.

FIG. 22A is an overall view of a service providing system in Embodiment 3.

Group 1000 is, for example, a company, an organization, a home, or the like, and a scale of group 1000 does not matter. In group 1000, apparatus A and apparatus B included in a plurality of apparatuses 1010, and home gateway 1020 are present. For example, the plurality of apparatuses 1010 correspond to panel 100, television 101, and the like in each of the embodiments described above. Home gateway 1020 corresponds to wireless router 103 in each of the embodiments described above. The plurality of apparatuses 1010 include apparatuses that are capable of being connected to the Internet (e.g., a smartphone, PC, TV, etc.) and apparatuses that are incapable of being connected to the Internet by themselves (e.g., an illumination, washing machine, etc.). Apparatuses that are incapable of being connected to the Internet by themselves but are capable of being connected to the Internet via home gateway 1020 may be present. In group 1000, user 990A who uses the plurality of apparatuses 1010 is present.

Figure 22B:
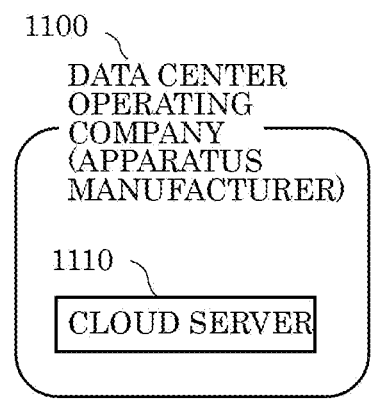
FIG. 22B illustrates an example of a data center operating company in Embodiment 2.
Figure 22C:
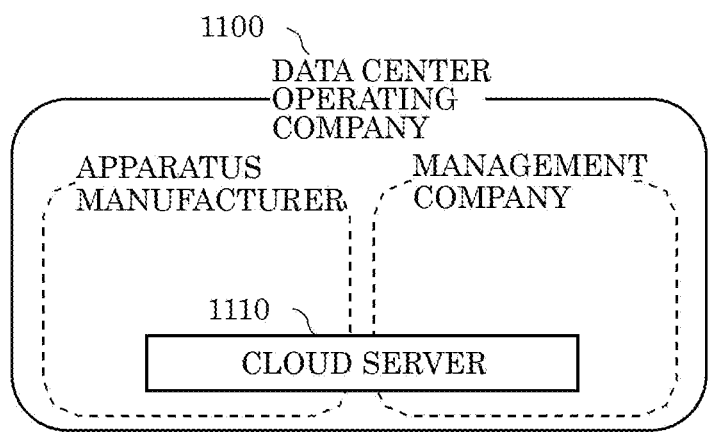
FIG. 22C illustrates an example of the data center operating company in Embodiment 2.

In data center operating company 1100, cloud server 1110 is present. Cloud server 1110 is a virtualized server that works together with various apparatuses over the Internet. Cloud server 1110 mainly manages data that is so huge to handle with a normal database management tool (big data) or the like. Data center operating company 1100 performs data management and management of cloud server 1110, operation of a data center that performs the managements, and the like. Services by data center operating company 1100 will be described below in detail. Here, data center operating company 1100 is not limited to a company that simply performs the data management, the management of cloud server 1110, and the like. For example, in a case where an apparatus manufacturer that develops and manufactures one of the plurality of apparatuses 1010 also performs the data management, the management of cloud server 1110, and the like, the apparatus manufacturer corresponds to data center operating company 1100 (FIG. 22B). Furthermore, data center operating company 1100 is not limited to a company. For example, in a case where the apparatus manufacturer and a management company perform the data management and the operation of cloud server 1110 in collaboration or in a sharing manner, one or both of the apparatus manufacturer and the management company correspond to data center operating company 1100 (FIG. 22C).

Service provider 1200 possesses server 1210. A scale of server 1210 herein does not matter, and examples of server 1210 include a memory in a personal computer and the like. The service provider may not possess server 1210. For example, server 1210 corresponds to the advertisement distribution system in each of the embodiments described above.

Note that home gateway 1020 is not indispensable in the service. For example, home gateway 1020 is not necessary in a case where cloud server 1110 performs the entire data management. Furthermore, there may be a case where no apparatus that is incapable of being connected to the Internet by itself, such as a case where every apparatus in a home is connected to the Internet.

Next, a flow of information in the service will be described.

First, apparatus A or apparatus B in group 1000 sends information obtained by the apparatus to cloud server 1110 in data center operating company 1100. Cloud server 1110 accumulates information from apparatus A or apparatus B ((a) in FIG. 22A). The information accumulated here is information indicating, for example, operating statuses, operating dates and times, operation modes, locations, and the like of the plurality of apparatuses 1010. Example of the information include information on a viewing history of a television, information on scheduling recording of a recorder, an operating date and time of a washing machine and an amount of laundry, dates and times and the number of open/close of a refrigerator, an amount of food in the refrigerator, and the like, but the information is not limited to these and refers to all kinds of information that can be obtained from every apparatus. The information may be provided directly to cloud server 1110 over the Internet from the plurality of apparatuses 1010. Alternatively, the information may be once accumulated in home gateway 1020 from the plurality of apparatuses 1010 and provided from home gateway 1020 to cloud server 1110.

Next, cloud server 1110 in data center operating company 1100 provides the information accumulated to service provider 1200 in a constant unit. Here, the constant unit may be a unit in which information accumulated by the data center operating company can be organized and provided to service provider 1200 or may be a unit that is requested by service provider 1200. Although described as the constant unit, the unit may not be constant, and a quantity of the information provided can vary based on circumstances. The information is saved in server 1210 possessed by service provider 1200 when necessary ((b) in FIG. 22A). Service provider 1200 then organizes the information into information that matches a service to be provided to a user and provides the organized information to the user. The users provided to may be user 990A who uses the plurality of apparatuses 1010 or user 990B outside. As a method for providing a service to a user, for example, the service may be provided directly to the user from the service provider ((e), (f) in FIG. 22A). Alternatively, as the method for providing a service to a user, for example, the service may be provided to the user via cloud server 1110 in data center operating company 1100 again ((c), (d) in FIG. 22A). Alternatively, cloud server 1110 in data center operating company 1100 may organize information into information that matches a service to be provided to a user and provide the organized information to service provider 1200.

Note that user 990A and user 990B may be separate users or may be the same user.

The technique described in the aspect described above can be implemented in the following types of cloud service. However, the types in which the technique described in the aspect described above are not limited to the following types.

[Service Type 1: In-House Data Center Type]

FIG. 23 illustrates Service type 1 (in-house data center type). This type is a type in which service provider 1200 obtains information from group 1000 and provides a service to a user. In this type, service provider 1200 has a function of the data center operating company. That is, the service provider possesses cloud server 1110 that manages the big data. Therefore, the data center operating company is absent.

In this type, service provider 1200 operates and manages data center 903 (cloud server 1110). In addition, service provider 1200 manages OS 902 and application 901. Service provider 1200 uses OS 902 and application 901 managed by service provider 1200 to provide service 904.

[Service Type 2: IaaS Utilization Type]

Figure 24:
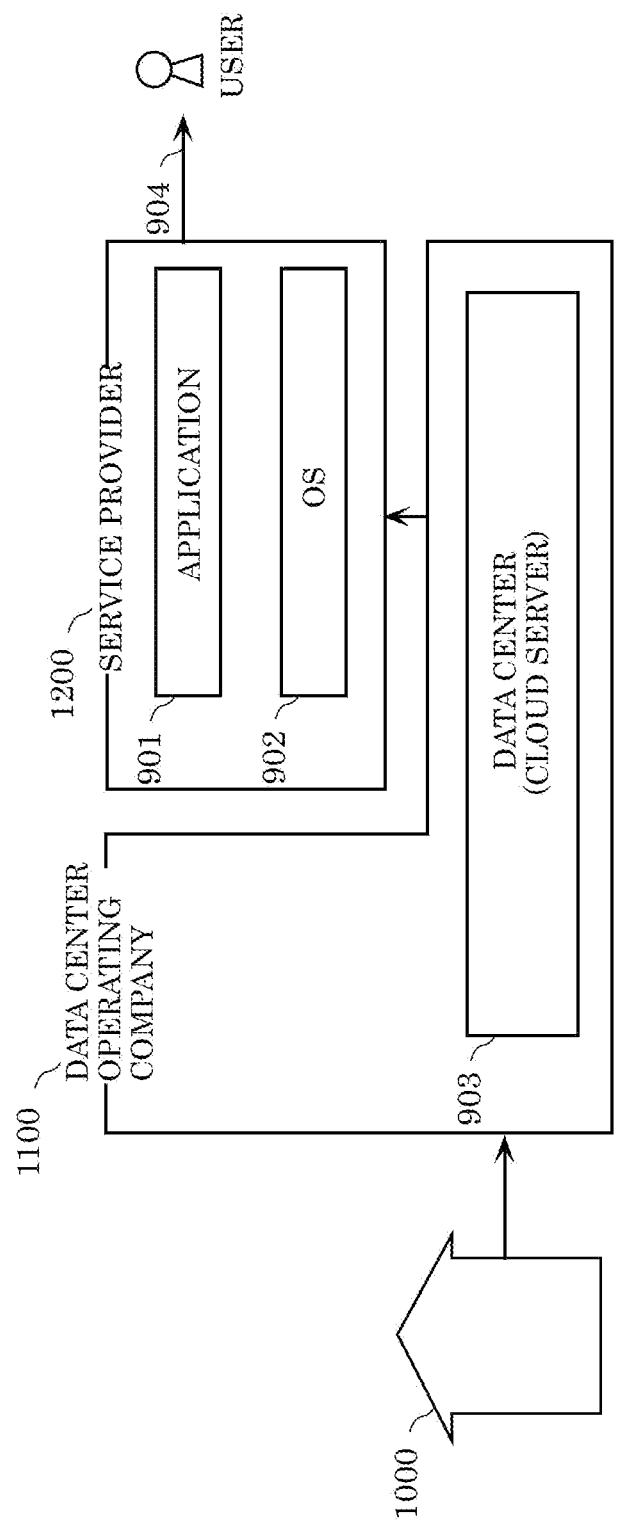
FIG. 24 illustrates Service type 2 (IaaS utilization type) in Embodiment 2.

FIG. 24 illustrates Service type 2 (IaaS utilization type). Here, IaaS stands for infrastructure as a service, which is a cloud service providing model in which an infrastructure for building and running a computer system is provided as such as a service over the Internet.

In this type, data center operating company 1100 operates and manages data center 903 (cloud server 1110). In addition, service provider 1200 manages OS 902 and application 901. Service provider 1200 uses OS 902 and application 901 managed by service provider 1200 to provide service 904.

[Service Type 3: PaaS Utilization Type]

Figure 25:
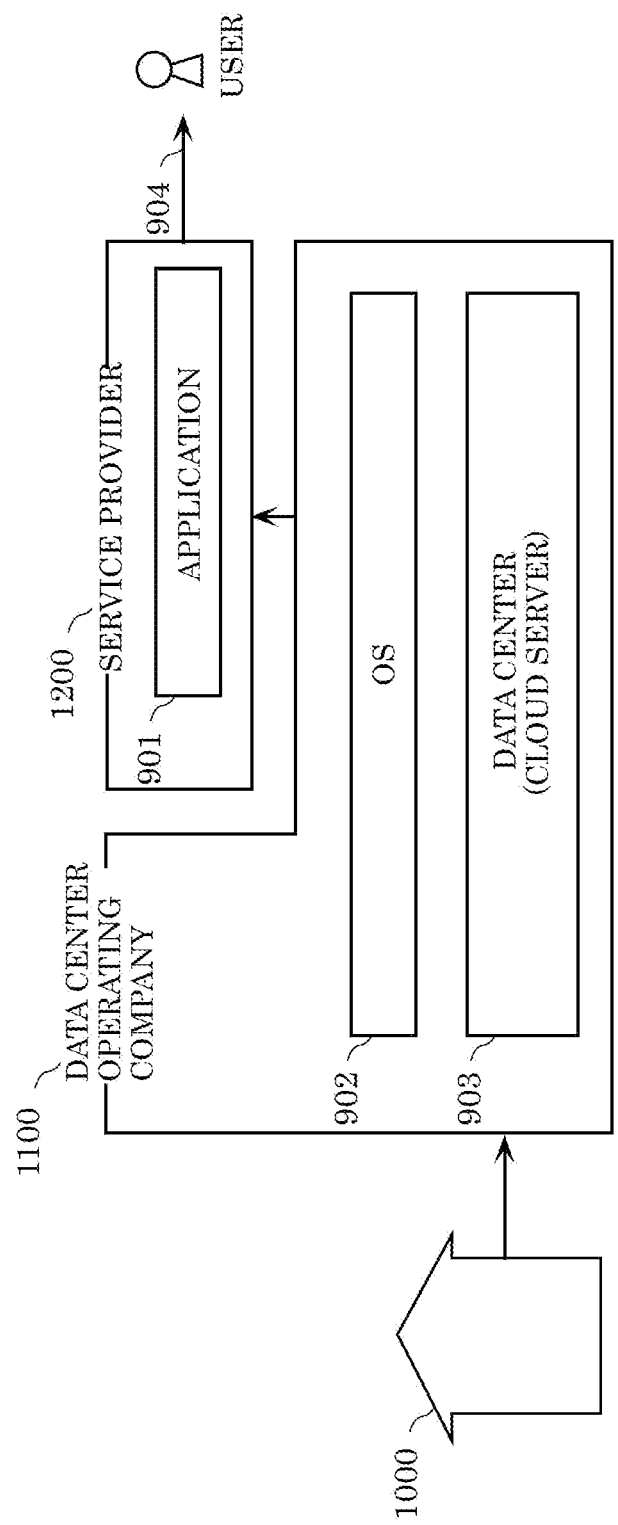
FIG. 25 illustrates Service type 3 (PaaS utilization type) in Embodiment 2.

FIG. 25 illustrates Service type 3 (PaaS utilization type). Here, PaaS stands for platform as a service, which is a cloud service providing model in which a platform serving as a foundation for building and running software is provided as a service over the Internet.

In this type, data center operating company 1100 manages OS 902, and operates and manages data center 903 (cloud server 1110). In addition, service provider 1200 manages application 901. Service provider 1200 uses OS 902 managed by the data center operating company and application 901 managed by service provider 1200 to provide service 904.

[Service Type 4: SaaS Utilization Type]

FIG. 26 illustrates Service type 4 (SaaS utilization type). Here, SaaS stands for software as a service. For example, SaaS is a cloud service providing model having a function that enables a company or a person (user) that does not possess a data center (cloud server) to use an application provided by a platform provider that possesses the data center (cloud server), over a network such as the Internet.

In this type, data center operating company 1100 manages application 901, manages OS 902, and operates and manages data center 903 (cloud server 1110). In addition, service provider 1200 uses OS 902 and application 901 managed by data center operating company 1100 to provide service 904.

In any of the types described above, it should be understood that service provider 1200 performs service providing operation. Alternatively, for example, the service provider or the data center operating company may develop the OS, the application, or a database for the big data by itself, or may outsource the OS, the application, or the database to a third party.

Other Embodiments

The advertisement distribution system according to one or more aspects of the present disclosure is described based on the embodiments, but the present disclosure is not limited to the embodiments. Various modifications conceived by those skilled in the art applied to the present embodiment and embodiments constituted by combining constituent components in other embodiments can be included within one or more aspects of the present disclosure without departing from the gist of the present disclosure.

Note that, in Embodiment 2 described above, the user is sensed by the sensor disposed in the indoor space, but the present disclosure is not limited to this. For example, the user may be registered to the indoor space or panel 100 in advance. The registration may be made by, for example, the user. For example, the user may be registered automatically to the indoor space or panel 100 in conformity with a predetermined rule. Based on the predetermined rule, for example, an oldest person is associated with the kitchen, and a youngest person is associated with the living room.

A user present in front of panel 100 may be sensed in real time, or information on past sensing may be used. As an example of referring to the past information, a user having a largest number or a highest frequency of uses may be associated to panel 100. A cumulative number or frequency of uses may be used, or the number or the frequency of uses during a given period may be used.

In addition, a usage permission of the sensor related to sensing a user and obtaining user information may be requested. For example, a user may be sensed when a permission from the user is given, and if the permission from the user cannot be given, user information registered in advance may be used. The permission can be obtained from the user using panel 100, a speaker, or the like.

The permission may be obtained for each user present in the dwelling space. Alternatively, a separate condition such as not using information on a user at a predetermined age or younger may be set. In a case where a user who gives a permission to use the sensor and a user who does not give the permission to use the sensor are present in the indoor space at the same time, the users may be identified, and the user information may be used in accordance with permission statuses of the identified users. If a user cannot be identified, a user may be inferred, and if even the inference of a user cannot be performed, the use of the sensor may be prohibited.

Note that the indoor space is not limited to the dwelling space. For example, the present disclosure is applicable also to a plurality of spaces in a building that includes a plurality of commercial facilities. Examples of the plurality of spaces include stores, a free space where a user takes a rest, and a space for meal such as a food court. For each of the spaces, information with which attributes of a user who is likely to visit the space are associated can be used.

INDUSTRIAL APPLICABILITY

The present disclosure is available as an advertisement distribution system that distributes an advertisement to an indoor space.

What is claimed is:

1. An advertisement providing method of providing an advertisement in an indoor space using a system including a processor and a memory that stores information about a content of each of a plurality of advertisements including a first advertisement, the processor and the memory being part of a database management tool, the advertisement providing method comprising the following executed by the processor:
   (a) calculating a base fee of the first advertisement from a content of the first advertisement stored in the memory based on a first criterion determined in advance based on a viewer's impression of each advertisement;
   (b) calculating an additional fee of the first advertisement in a case where the first advertisement is determined to be improper to the system from the content of the first advertisement, based on a second criterion determined in advance to determine whether an advertisement is improper to the system;
   (c) selecting an advertisement to be provided from among the plurality of advertisements based on a sum of the base fee calculated and the additional fee calculated; and
   (d) outputting an instruction to provide, to the indoor space, the advertisement selected.

2. The advertisement providing method according to claim 1, further comprising:
   (e) changing the base fee based on frequency of purchase via an information display terminal disposed in the indoor space, wherein in (c), the advertisement to be provided is selected from among the plurality of advertisements based on a sum of the base fee changed and the additional fee calculated.

3. The advertisement providing method according to claim 1, further comprising:
(f) changing the base fee based on a result of social media sentiment analysis on a term related to the content of the first advertisement, wherein
in (c), the advertisement to be provided is selected from among the plurality of advertisements based on a sum of the base fee changed and the additional fee calculated.

4. An advertisement distribution system that distributes an advertisement to an indoor space, the advertisement distribution system comprising:
a processor; and
a memory that stores information about a content of each of a plurality of advertisements including a first advertisement, the processor and the memory being part of a database management tool, wherein
the processor:
(a) calculates a base fee of the first advertisement from a content of the first advertisement stored in the memory based on a first criterion determined in advance based on a viewer's impression of each advertisement;
(b) calculates an additional fee of the first advertisement in a case where the first advertisement is determined to be improper to the system from the content of the first advertisement based on a second criterion determined in advance to determine whether to be an advertisement is improper to the system;
(c) selects an advertisement to be provided from among the plurality of advertisements based on a sum of the base fee calculated and the additional fee calculated; and
(d) outputs an instruction to provide, to the indoor space, the advertisement selected.

5. The advertisement providing method according to claim 1, wherein
the first criterion is whether the first advertisement contains at least one of a violent expression, a religious expression, and an adult expression.

6. The advertisement distribution system according to claim 4, wherein
the first criterion is whether the first advertisement contains at least one of a violent expression, a religious expression, and an adult expression.

* * * * *